(12) United States Patent
Iwata et al.

(10) Patent No.: US 7,188,088 B2
(45) Date of Patent: Mar. 6, 2007

(54) VIDEO EDITING APPARATUS, VIDEO EDITING METHOD, AND RECORDING MEDIUM

(75) Inventors: Yoshiaki Iwata, Neyagawa (JP); Kazuo Kajimoto, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1165 days.

(21) Appl. No.: 09/730,767

(22) Filed: Dec. 7, 2000

(65) Prior Publication Data

US 2001/0041050 A1 Nov. 15, 2001

(30) Foreign Application Priority Data

Dec. 7, 1999 (JP) ................................. 11-347128

(51) Int. Cl.
*G06Q 99/00* (2006.01)
(52) U.S. Cl. ............................... 705/59; 705/1; 705/80
(58) Field of Classification Search ................. 705/59, 705/32, 54, 1, 80; 725/41; 386/52
See application file for complete search history.

(56) References Cited

U.S. PATENT DOCUMENTS

| | | | | | |
|---|---|---|---|---|---|
| 5,444,779 | A | * | 8/1995 | Daniele | 399/366 |
| 5,802,240 | A | * | 9/1998 | Asai | 386/52 |
| 5,867,579 | A | * | 2/1999 | Saito | 705/57 |
| 6,427,140 | B1 | * | 7/2002 | Ginter et al. | 705/80 |

FOREIGN PATENT DOCUMENTS

| | | |
|---|---|---|
| JP | 8-195064 | 7/1996 |
| JP | 11-312175 | 11/1999 |
| WO | WO 98/05034 | * 2/1998 |

OTHER PUBLICATIONS

"XOOM.com Adopts Cybergold's Payment System for Online Transactions", Sep. 30, 1999, PR Newsire. New York: p. 1.*
"Canopus Ships DVRex-M1; Company gives away VideoRaid storage system with its breakthrough DV editing solution", Mar. 2, 1998, Business Wire. New York; p. 1.*
Standage, Tom, "CONNECTED: Desktop PCs go to the movies-and beyond", Apr. 22, 1997, The Daily Telegraph, p. 5.*

* cited by examiner

*Primary Examiner*—John W. Hayes
*Assistant Examiner*—Freda A Nelson
(74) *Attorney, Agent, or Firm*—Wenderoth, Lind & Ponack, L.L.P.

(57) ABSTRACT

A video data storing unit stores video data pieces. An editing information generating unit generates editing information sets. A copyright information storing unit stores a standard copyright royalty fee for each video data piece. A royalty fee calculation unit calculates a total copyright royalty fee using the editing information sets and the standard copyright royalty fees. An upper limit judging unit judges whether the total copyright royalty fee exceeds an upper limit. If the total copyright royalty fee exceeds the upper limit, a reediting unit deletes part of a clip to reduce the total copyright royalty fee to a level no more than the upper limit.

6 Claims, 25 Drawing Sheets

10 VIDEO EDITING APPARATUS

FIG. 6

105 COPYRIGHT INFORMATION STORING UNIT

COPYRIGHT INFORMATION TABLE  331

| VIDEO DATA IDENTIFIER | OBJECT START POINT | OBJECT END POINT | COPYRIGHT INFORMATION ||||||| 
|---|---|---|---|---|---|---|---|---|---|
| | | | ENCRYPTION NECESSITY | DISTRIBUTION PATTERN | PICTURE QUALITY | VALIDITY | STANDARD COPYRIGHT ROYALTY | COPYRIGHT HOLDER NAME | PAYEE NAME |
| Scene01.avi | 00:00:00:00 | 00:30:00:00 | YES | SALE | HIGH | YEAR'S END | 3YEN/SEC | ○AH△CE | ●● SOCIETY |
| Scene01.avi | 00:00:00:00 | 01:00:00:00 | YES | SALE | HIGH | YEAR'S END | 200YEN | ◆◆◆Co. | ◆◆◆Co. |
| Scene01.avi | 00:45:00:00 | 01:00:00:00 | YES | SALE | HIGH | YEAR'S END | 3YEN/SEC | ■FE◇HE | ■FE◇HE |
| Scene03.avi | 00:00:00:00 | 02:00:00:00 | YES | SALE | HIGH | YEAR'S END | 30YEN/MIN | ○AH△CE | ●● SOCIETY |
| Scene01.avi | 00:00:00:00 | 00:30:00:00 | NO | SALE | HIGH | YEAR'S END | 30YEN/SEC | ○AH△CE | ●● SOCIETY |
| Scene01.avi | 00:00:00:00 | 01:00:00:00 | NO | SALE | HIGH | YEAR'S END | 2000YEN | ◆◆◆Co. | ◆◆◆Co. |
| Scene01.avi | 00:45:00:00 | 01:00:00:00 | NO | SALE | HIGH | YEAR'S END | 30YEN/SEC | ■FE◇HE | ■FE◇HE |
| Scene03.avi | 00:00:00:00 | 02:00:00:00 | YES | SALE | HIGH | YEAR'S END | 300YEN/MIN | ○AH△CE | ●● SOCIETY |
| Scene01.avi | 00:00:00:00 | 00:30:00:00 | YES | BROADCAST | HIGH | YEAR'S END | 6YEN/SEC | ○AH△CE | ●● SOCIETY |
| Scene01.avi | 00:00:00:00 | 01:00:00:00 | YES | BROADCAST | HIGH | YEAR'S END | 1000YEN | ◆◆◆Co. | ◆◆◆Co. |
| Scene01.avi | 00:45:00:00 | 01:00:00:00 | YES | BROADCAST | HIGH | YEAR'S END | 6YEN/SEC | ■FE◇HE | ■FE◇HE |
| Scene03.avi | 00:00:00:00 | 02:00:00:00 | YES | BROADCAST | HIGH | YEAR'S END | 60YEN/MIN | ○AH△CE | ●● SOCIETY |

FIG. 7

105 — COPYRIGHT INFORMATION STORING UNIT

COPYRIGHT HOLDER PRIORITY TABLE — 341

COPYRIGHT HOLDER PRIORITY INFORMATION

| VIDEO DATA IDENTIFIER | OBJECT START POINT | OBJECT END POINT | COPYRIGHT HOLDER PRIORITY |
|---|---|---|---|
| Scene01.avi | 00:00:00:00 | 00:09:59:99 | 0 |
| | 00:10:00:00 | 00:30:00:00 | DELETION IS NOT ALLOWED |
| | 00:30:00:01 | 00:35:00:00 | 0 |
| | 00:35:00:01 | 00:40:00:00 | 1 |
| | 00:40:00:01 | 01:00:00:00 | 2 |
| Scene03.avi | 00:00:00:00 | 00:29:59:99 | 0 |
| | 00:30:00:00 | 02:00:00:00 | 1 |

FIG. 8

102 EDITING INFORMATION STORING UNIT

311 EDITING INFORMATION TABLE

| ID | VIDEO DATA IDENTIFIER | SECTION INFROMATION | |
|---|---|---|---|
| | | REPRODUCTION START POINT | REPRODUCTION END POINT |
| 001 | Scene01.avi | 00:10:00:00 | 00:40:25:00 |
| 002 | Scene03.avi | 00:00:00:00 | 01:00:00:00 |
| 003 | Scene02.avi | 00:32:00:00 | 00:50:00:00 |

FIG. 9

102 — EDITING INFORMATION STORING UNIT

321 — EDITOR PRIORITY TABLE

EDITOR PRIORITY INFORMATION

| ID | VIDEO DATA IDENTIFIER | OBJECT START POINT | OBJECT END POINT | EDITOR PRIORITY |
|---|---|---|---|---|
| 001 | Scene01.avi | 00:10:00:00 | 00:30:00:00 | DELETION IS NOT ALLOWED |
|  |  | 00:30:00:01 | 00:35:00:00 | 0 |
|  |  | 00:35:00:01 | 00:40:00:00 | 1 |
|  |  | 00:40:00:01 | 00:40:25:00 | 2 |
| 002 | Scene03.avi | 00:00:00:00 | 00:29:59:99 | DELETION IS NOT ALLOWED |
|  |  | 00:30:00:00 | 01:00:00:00 | 2 |
| 003 | Scene02.avi | 00:32:00:00 | 00:50:00:00 | DELETION IS NOT ALLOWED |

FIG. 11

USAGE CONDITION (210)

- 211 DISTRIBUTION PATTERN
  - ● DVD SALE
  - ○ VHS SALE
  - ○ PAY BROADCAST
  - ○ FREE BROADCAST
  - ○ Web DISTRIBUTION

- 212 ENCRYPTION NECESSITY
  - ● YES
  - ○ NO

- 213 PICTURE QUALITY
  - ● HIGH
  - ○ MIDDLE
  - ○ LOW

- 214 VALIDITY
  - ● YEAR'S END
  - ○ JUNE 2001
  - ○ DECEMBER 2001

- 215 BROADCAST DATE AND TIME
  - ☐ MONTH ☐ DATE ☐ TIME

- 216 MAXIMUM ROYALTY FEE
  - ☐ YEN

FIG. 12

INTERIM CALCULATION INFORMATION TABLE ~361

| MATERIAL NAME | OBJECT START POINT | OBJECT END POINT | STANDARD COPYRIGHT ROYALTY FEE | COPYRIGHT HOLDER NAME | PAYEE NAME | USAGE START POINT | USAGE END POINT |
|---|---|---|---|---|---|---|---|
| Scene01.avi | 00:00:00:00 | 00:30:00:00 | 3YEN/SEC | ○AH △CE | ●● SOCIETY | 00:10:00:00 | 00:30:00:00 |
| Scene01.avi | 00:00:00:00 | 01:00:00:00 | 200YEN | ◆◆Co. | ◆◆Co. | 00:10:00:00 | 00:40:25:00 |
| Scene03.avi | 00:00:00:00 | 02:00:00:00 | 30YEN/MIN | ○AH △CE | ●● SOCIETY | 00:00:00:00 | 01:00:00:00 |

FIG. 14

REEDITING INFORMATION TABLE 381

| ID | REEDITING INFORMATION | | | | | | |
|---|---|---|---|---|---|---|---|
| | VIDEO DATA IDENTIFIER | OBJECT START POINT | OBJECT END POINT | REEDITING START POINT | REEDITING END POINT | COPYRIGHT HOLDER PRIORITY | EDITOR PRIORITY |
| 001 | Scene01.avi | 00:10:00:00 | 00:40:25:00 | 00:10:00:00 | 00:30:00:00 | DELECTION IS NOT ALLOWED | DELECTION IS NOT ALLOWED |
| | | | | 00:30:00:01 | 00:35:00:00 | 0 | 0 |
| | | | | 00:35:00:01 | 00:40:00:00 | 1 | 1 |
| | | | | 00:40:00:01 | 00:40:25:00 | 2 | 2 |
| 002 | Scene03.avi | 00:00:00:00 | 01:00:00:00 | 00:00:00:00 | 00:29:59:99 | 0 | DELECTION IS NOT ALLOWED |
| | | | | 00:30:00:00 | 01:00:00:00 | 1 | 1 |
| 003 | Scene02.avi | 00:32:00:00 | 00:50:00:00 | 00:32:00:00 | 00:50:00:00 | — | DELECTION IS NOT ALLOWED |

107 REEDITING INFORMATION STORING UNIT

VIDEO EDITING APPARATUS, VIDEO EDITING METHOD, AND RECORDING MEDIUM

This application is based on application No. 11-347128 filed in Japan, the content of which is hereby incorporated by reference.

BACKGROUND OF THE INVENTION

1. Field of the Invention

The present invention relates to a technique of editing and merging video data.

2. Description of the Related Art

In recent years, video editing apparatuses that reproduce, edit, and record video contents in digital formats have come into widespread use.

*The Journal of the Television Society*, Vol. 50, No. 8 (1996) pp. 26–29 (the society's name is currently "the Institute of Image Information and Television Engineers") discloses a video editing apparatus that includes an editing information storing unit, an editing information generating unit, a video data storing unit, and a video reproduction unit. With this construction, the video editing apparatus reproduces a video content by merging a plurality of video materials (also called "video data pieces" in this specification) that include video data and audio data.

Video materials are granted various copyrights, such as the copyrights for their producers and performers. Therefore, if a video content is produced by editing copyrighted video materials and is broadcasted or recorded onto recording media for the purpose of distribution or sale, the producer of the video content needs to be licensed by the copyright holders to use the video materials or to pay royalty fees for the video materials to the copyright holders.

Against this backdrop, video content producers increasingly wish to estimate the royalty fees for video contents while producing the video contents by editing copyrighted video materials.

SUMMARY OF THE INVENTION

The object of the present invention is therefore to provide a video editing apparatus, a video editing method, and a recording medium that all estimate the copyright royalty fees for video contents while producing the video contents by editing copyrighted video materials.

The stated object is achieved by a video editing apparatus that edits a plurality of video material data pieces to generate a video program, including: a video content data storing unit operable to store the video program generated by editing the plurality of video material data pieces; a copyright royalty storing unit operable to store copyright information showing standard copyright royalties that respectively correspond to the plurality of video material data pieces; and a calculation unit operable to calculate a total copyright royalty for the video program according to the copyright information.

With this construction, the video editing apparatus calculates the total copyright royalty fee for a video program while producing the video program.

Here, the video editing apparatus may further include: a maximum royalty receiving unit operable to receive, from a user, a designation of a maximum copyright royalty; a maximum royalty judging unit operable to judge whether the total copyright royalty exceeds the maximum copyright royalty; and a warning unit operable to output a warning for the user, if a judgement result of the maximum royalty judging unit is positive.

With this construction, if the total copyright royalty fee exceeds the upper limit, the video editing apparatus outputs a warning. This allows the user to immediately recognize the situation where the total copyright royalty fee exceeds the upper limit.

Here, the video editing apparatus may further include: a video reediting unit operable to delete part of a clip, out of the plurality of clips; and a repeat control unit operable to have, if the judgement result of the maximum royalty judging unit is positive, the video reediting unit, the calculation unit, and the maximum royalty judging unit repeatedly operate until the total copyright royalty becomes no more than the maximum copyright royalty.

With this construction, if the total copyright royalty fee exceeds the upper limit, the video editing apparatus deletes part of a clip to reduce the total copyright royalty fee to a level no more than the upper limit. This allows the user to produce a video program whose total copyright royalty fee is no more than the upper limit.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6 shows the data structure of a copyright information table;

FIG. 7 shows the data structure of a copyright holder priority table;

FIG. 8 shows the data structure of an editing information table;

FIG. 9 shows the data structure of an editor priority table;

FIG. 11 shows an example of a usage condition input screen displayed by the video editing apparatus;

FIG. 12 shows the data structure of an interim calculation information table;

FIG. 14 shows the data structure of a reediting information table;

DESCRIPTION OF THE PREFERRED EMBODIMENTS

The following is a description of a video editing apparatus 10 according to an embodiment of the present invention.

<1. Construction of Video Editing Apparatus 10>

Figure 1:
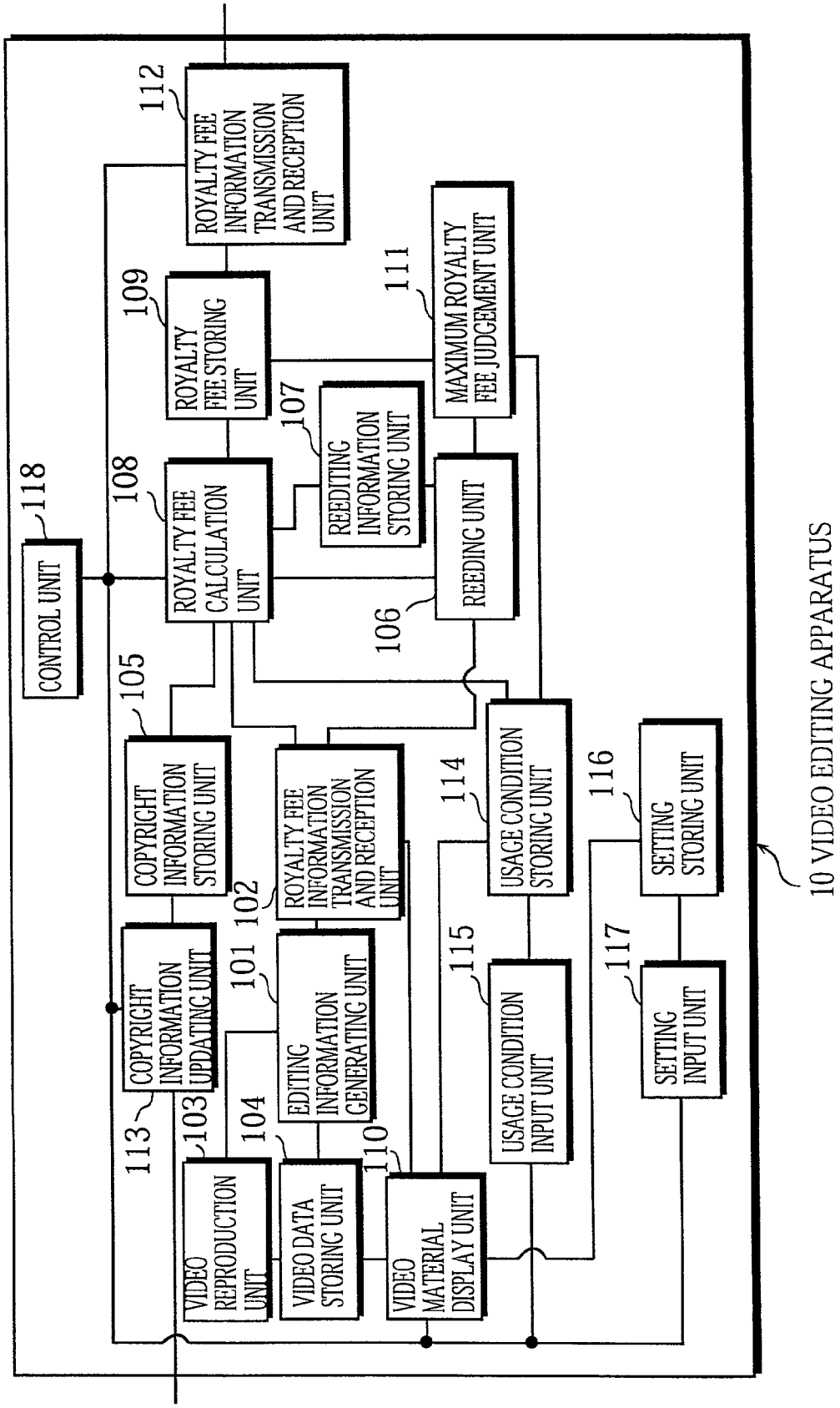
FIG. 1 is a functional block diagram showing the construction of a video editing apparatus of an embodiment.

FIG. 1 is a block diagram showing the construction of the video editing apparatus 10. As shown in this drawing, the video editing apparatus 10 includes an editing information generating unit 101, an editing information storing unit 102, a video reproduction unit 103, a video data storing unit 104, a copyright information storing unit 105, a reediting unit 106, a reediting information storing unit 107, a royalty fee calculation unit 108, a royalty fee storing unit 109, a video material display unit 110, an upper limit judgement unit 111, a royalty fee information transmission and reception unit 112, a copyright information updating unit 113, a usage condition storing unit 114, a usage condition input unit 115, a setting storing unit 116, a setting input unit 117, and a control unit 118.

Figure 2:
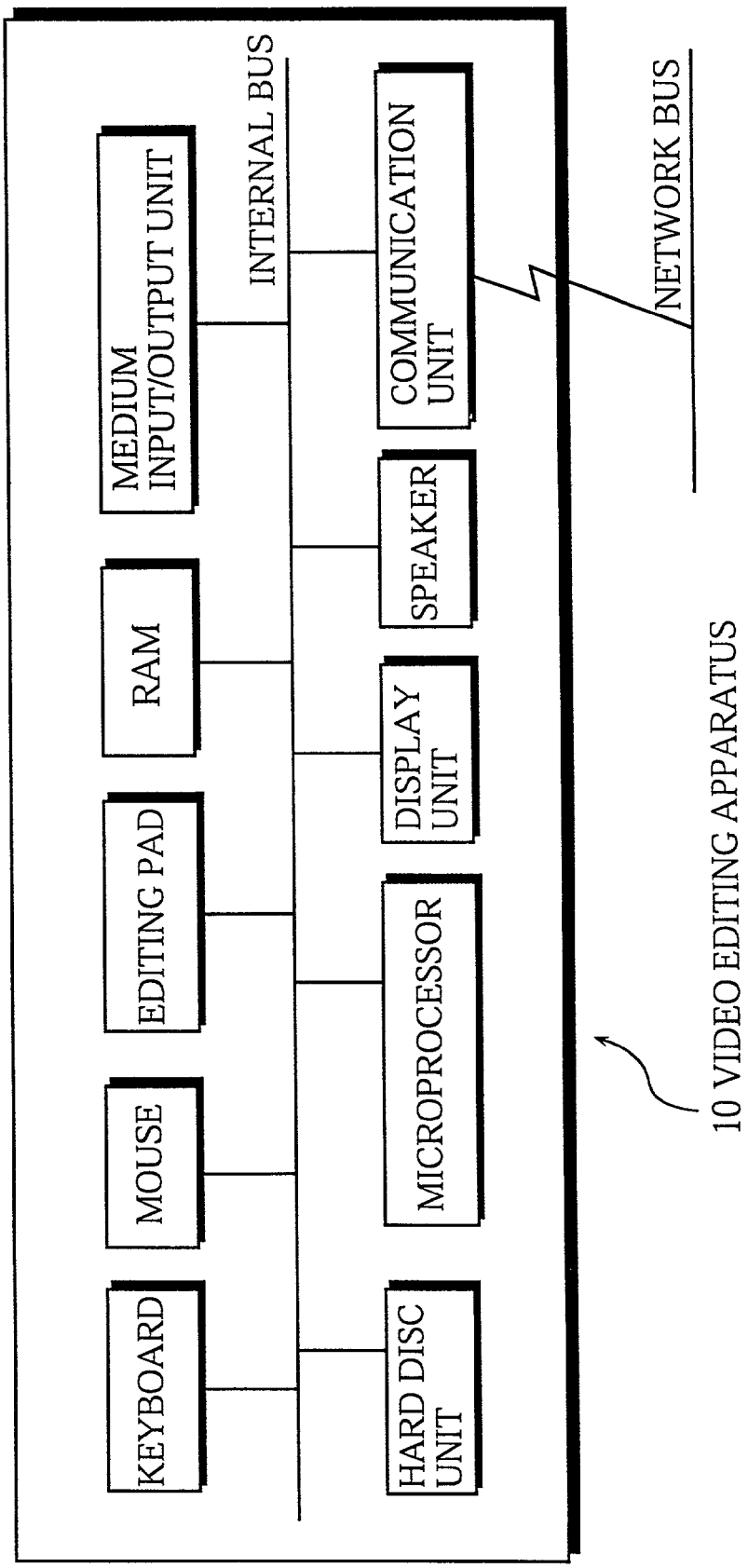
FIG. 2 shows the hardware construction elements of the video editing apparatus.

As shown in FIG. 2, the actual construction elements of the video editing apparatus 10 are, for instance, a keyboard, a mouse, an editing pad, a RAM, a media input/output unit, a hard disc unit, a microprocessor, a display unit, a speaker, a communication unit, and an internal bus. The keyboard, mouse, editing pad, RAM, media input/output unit, hard disc unit, microprocessor, display unit, speaker, and communication unit are connected to each other via the internal bus. Also, the communication unit is connected to an external apparatus via a network bus. The hard disc unit stores a computer program to be executed by the microprocessor. By executing the computer program, the microprocessor achieves the functions of the editing information generating unit 101, video reproduction unit 103, reediting unit 106, royalty fee calculation unit 108, video material display unit 110, upper limit judgement unit 111, royalty fee information transmission and reception unit 112, copyright information updating unit 113, usage condition input unit 115, setting input unit 117, and control unit 118 of the video editing apparatus 10.

A user produces a video content by dragging and dropping icons of video materials that are displayed in a time axis editor area (described later) on the display unit, and checks the production result using various information displayed on the display unit or a separate monitor that is connected to the video editing apparatus 10. The various information includes the distribution patterns of video materials, which are used for the video content, and the current total royalty fee for the video materials.

(1) Video Data Storing Unit 104

Figure 3:
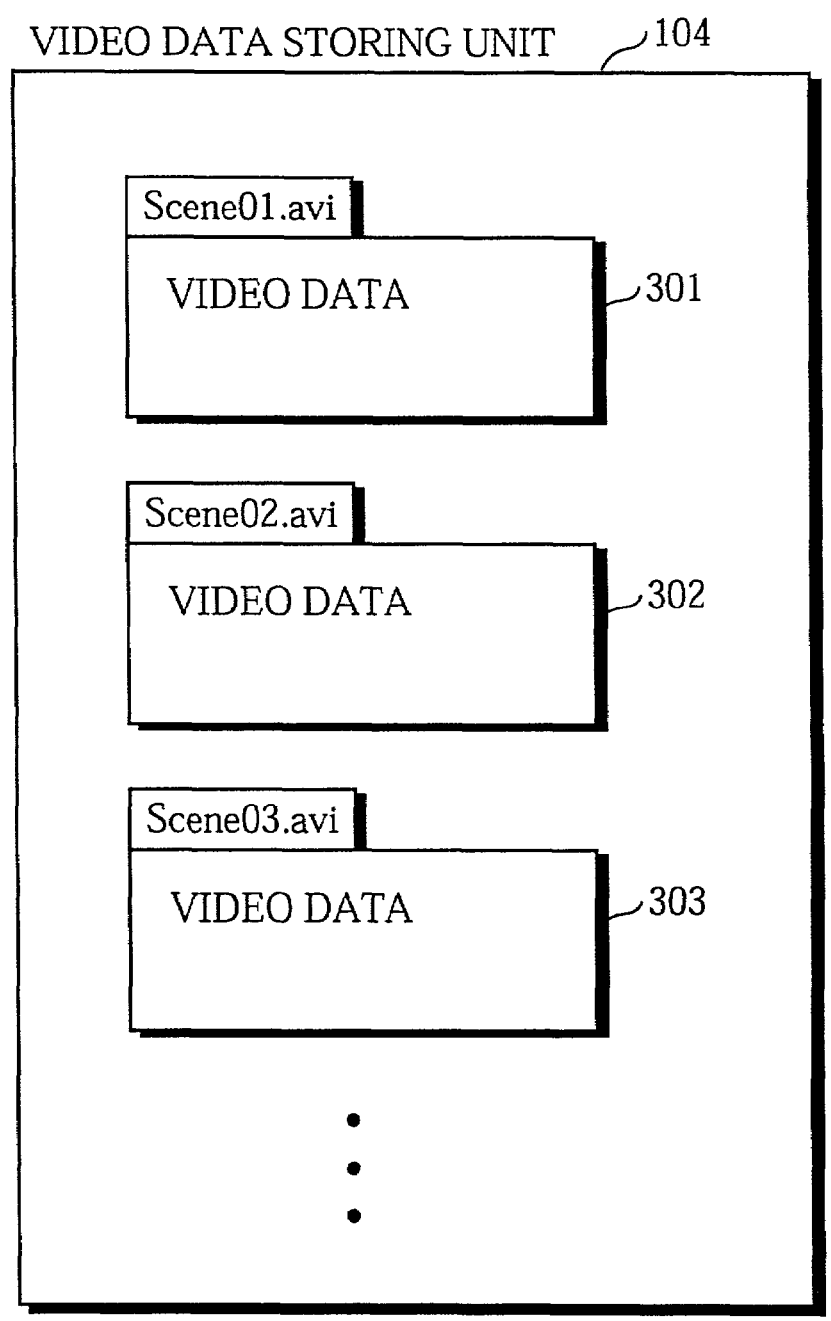
FIG. 3 shows an example state where video data pieces are stored in a video data storing unit.

The video data storing unit 104 is achieved by the hard disc unit and stores at least one pair of a video data piece and a video data identifier. The video data piece is a data piece where digital moving picture signals and audio signals have been compressed and encoded, and the video data identifier is used to identify the video data piece. FIG. 3 shows a state where a plurality of pairs of video data pieces and video data identifiers are stored in the video data storing unit 104. Here, each video data piece includes a representative picture data piece.

(2) Control Unit 118

The control unit 118 performs initialization processing immediately after the video editing apparatus 10 is activated. The initialization processing is the generation of a display screen 200 including a menu bar, a video output area, a usage condition area, a time axis editor area, a copyright royalty fee area, and a message area. Here, the menu bar includes various buttons, such as a video editing button, a usage condition button, a royalty fee calculation button, a royalty fee information transmission button, a copyright information updating button, an other setting button, and an end button. The time axis editor area includes a pre-reediting area and a post-reediting area and displays a time axis. The copyright royalty fee area includes a pre-reediting total royalty fee display area and a post-reediting total royalty fee display area. After the initialization processing, the control unit 118 displays the display screen 200 on the display unit and instructs the video material display unit 110 to display video materials.

Figure 4:
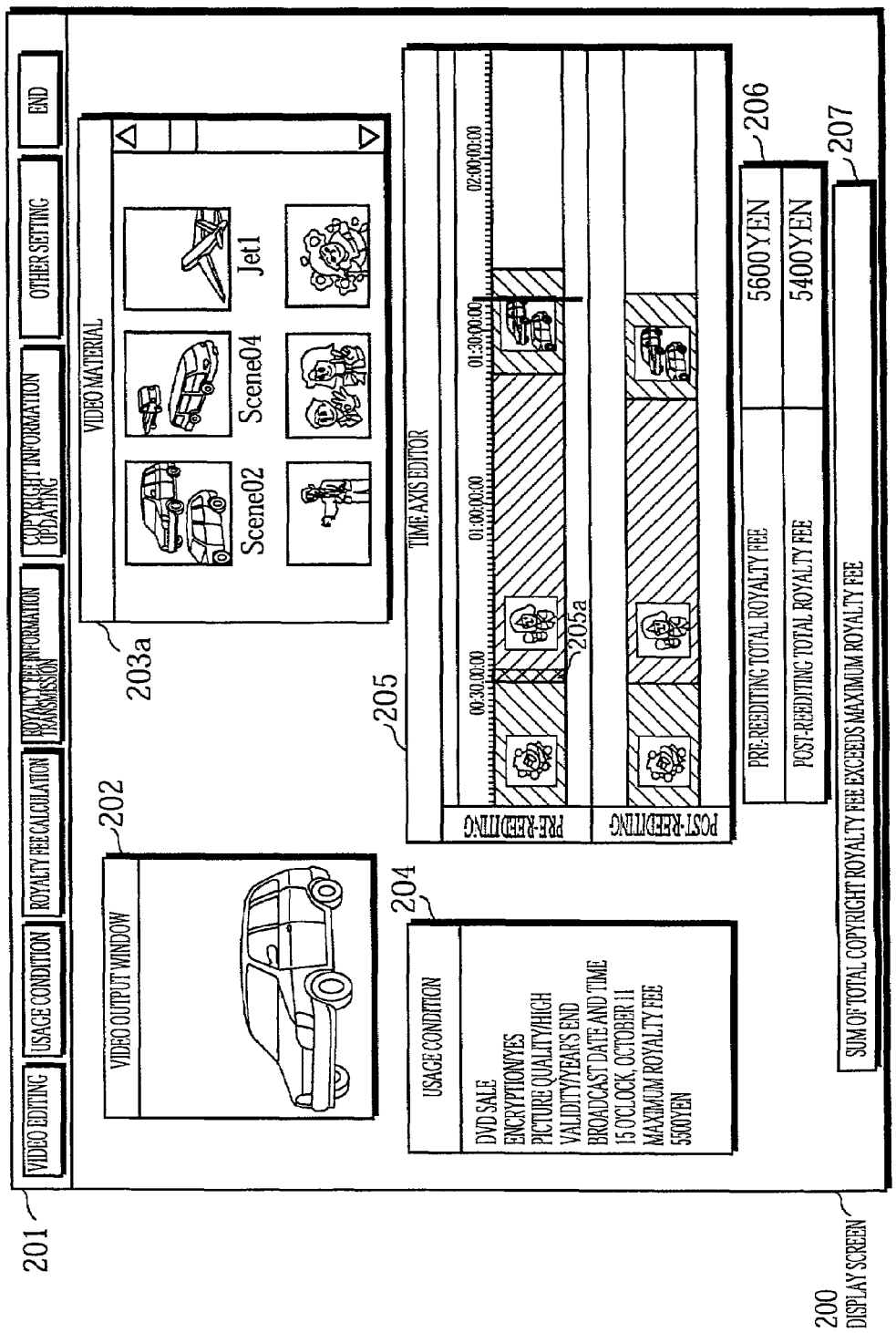
FIG. 4 shows an example of a display screen displayed by the video editing apparatus.

An example of the display screen 200 is shown in FIG. 4. As shown in this drawing, the display screen 200 includes a menu bar 201, a video output area 202, a video material area 203a, a usage condition area 204, a time axis editor area 205, a copyright royalty fee area 206, and a message area 207.

The control unit 118 detects which button on the menu bar is pushed by the user. If the user pushes the video editing button, the control unit 118 instructs the editing information generating unit 101 to start processing. If the user pushes the usage condition button, the control unit 118 instructs the usage condition input unit 115 to start processing. If the user pushes the royalty fee calculation button, the control unit 118 instructs the royalty fee calculation unit 108 to start processing. If the user pushes the royalty fee information transmission button, the control unit 118 instructs the royalty fee information transmission and reception unit 112 to start processing. If the user pushes the copyright information updating button, the control unit 118 instructs the copyright information updating unit 113 to start processing. If the user pushes the other setting button, the control unit 118 instructs the setting input unit 117 to start processing.

If the user pushes the end button, the control unit 118 terminates the processing of the video editing apparatus 10.

(3) Setting Storing Unit 116

The setting storing unit 116 is achieved by a RAM and stores which one of two video material display modes is set.

One of the two modes is to display video materials with the corresponding royalty fees in the video material area.

The other of the two modes is to display video materials without the corresponding royalty fees in the video material area.

The video material display mode, which is set immediately after the video editing apparatus 10 is activated, is to display video materials without the corresponding royalty fees.

Figure 5:
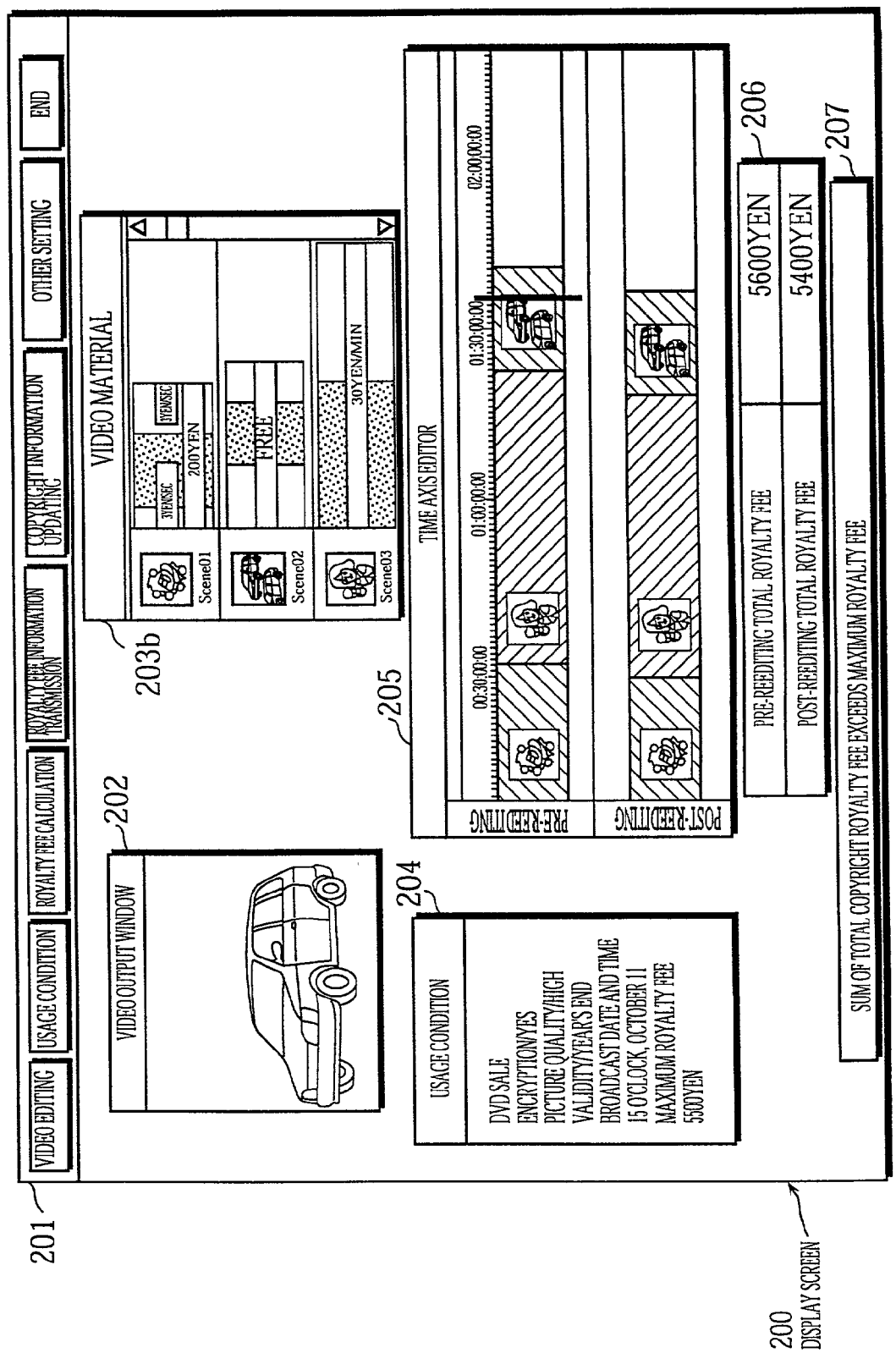
FIG. 5 shows another example of the display screen displayed by the video editing apparatus.

FIG. 4 shows an example of the video material area where video materials are displayed without the corresponding royalty fees and FIG. 5 shows an example of the video material area where video materials are displayed with the corresponding royalty fees.

(4) Setting Input Unit 117

The setting input unit 117 receives a designation of a video material display mode from the user and writes the designated mode into the setting storing unit 116.

(5) Copyright Information Storing Unit 105

The copyright information storing unit 105 is achieved by the hard disc unit and stores a copyright information table 331 and a copyright holder priority table 341. An example of the copyright information table 331 is shown in FIG. 6 and an example of the copyright holder priority table 341 is shown in FIG. 7.

(Copyright Information Table 331)

The copyright information table 331 is a data table that includes at least one copyright information set, each of which corresponds to one video data piece stored in the video data storing unit 104.

Each copyright information set gives a video data identifier, an object start point, an object end point, an encryption necessity, a distribution pattern, a picture quality, a validity, a standard copyright royalty fee, a copyright holder name, and a payee name.

Each video data identifier is an identifier used to identify a video data piece stored in the video data storing unit 104.

Each object start point specifies the start point of a video section of the video data piece assigned a corresponding video data identifier. Also, each object end point specifies the end point of a video section of the video data piece assigned a corresponding video data identifier. Therefore, a video section is specified by a pair of an object start point and an object end point. The start point and end point of a video section each give a time value (an hour, a minute, and a second) and a frame number. For instance, a point "01:10:10:50" represents the fiftieth frame of a corresponding video data piece where one hour, ten minutes, and ten seconds have elapsed since the start point of the corresponding video data piece.

It should be noted here that in the field of video editing, each reproduction start point is called an IN point and each reproduction end point is called an OUT point.

Each encryption necessity shows whether the video data piece assigned a corresponding video data identifier needs to be encrypted before the video data piece is provided to viewers. If the encryption necessity is set as "Yes", the corresponding video data piece needs to be encrypted before being provided; if the encryption necessity is set as "No", the corresponding video data piece does not need to be encrypted before being provided.

Each distribution pattern is a method for providing the video data piece assigned a corresponding video data identifier to viewers. Each distribution pattern is set as "sale", "broadcast", or "Web distribution". If the distribution pattern of a video data piece is set as "sale", the video data piece will be sold on recording media. If the distribution pattern of a video data piece is set as "broadcast", the video data piece will be broadcasted. If the distribution pattern of a video data piece is set as "Web distribution", the video data piece will be distributed via the Internet. If the distribution pattern of a video data piece is set as "sale", the video data piece will be sold on DVDs or VHS tapes ("DVD sale" or "VHS sale"). Also, if the distribution pattern of a video data piece is set as "broadcast", the video data piece will be broadcasted as a "pay broadcast" for which viewers need to pay charges or a "free broadcast" for which viewers do not need to pay charges.

Each picture quality indicates the picture quality of the video data piece assigned a corresponding video data identifier and is set as "high" representing that the picture quality is high, "middle" representing that the picture quality is reasonable, or "low" representing that the picture quality is low.

Each standard copyright royalty fee indicates the standard royalty fee for the video section, which is specified by a corresponding object start point and object end point, of the video data piece assigned a corresponding video data identifier. Here, the standard royalty fee is determined by a corresponding encryption necessity, distribution pattern, picture quality, and validity. The copyright royalty fee for a video data piece is calculated on an as-used basis where the royalty fee is calculated according to how long the video data piece is used or on a fixed basis where a royalty fee remains constant regardless of how long the video data piece is used. For instance, in FIG. 6, the standard copyright royalty fee "3 yen/sec" indicates that the royalty fee for a corresponding video data piece is calculated on an as-used basis and three yen is added to the copyright royalty fee each time the corresponding video data piece is used for one second. Also, the standard copyright royalty fee "200 yen" indicates that the royalty fee for a corresponding video data does not increase from 200 yen regardless of how long the corresponding video data is used.

Each copyright holder name shows who is the copyright holder of the video section, which is specified by a corresponding object start point and object end point, of the video data piece assigned a corresponding video data identifier.

Each payee name shows who is the payee of the video section, which is specified by a corresponding object start point and object end point, of the video data piece assigned a corresponding video data identifier.

A copyright information set is generated for each video data piece stored in the video data storing unit 104 and is stored in the copyright information storing unit 105.

The following is a detailed description of the meanings of the copyright information sets shown in FIG. 6. The following description concerns each copyright information set whose video data identifier, encryption necessity, distribution pattern, picture quality, and validity are respectively "Scene01.avi", "Yes", "Sale", "High", and "Year's End". If the video section between the object start point "00:00:00:00" and the object end point "00:30:00:00" is used, the copyright holder of this video section is "○AH ΔCE" and three yen needs to be paid to "●● SOCIETY" each time the video section is used for one second. If the video section between the object start point "00:45:00:00" and the object end point "01:00:00:00" is used, the copyright holder of this video section is "■FE ◇HE" and three yen needs to be paid to "■FE ◇HE" each time the video section is used for one second. If the video section between the object start point "00:00:00:00" and the object end point "01:00:00:00" is used, the copyright holder of this video section is "♦♦♦Co." and 200 yen needs to be paid to "♦♦♦Co." regardless of how long the video section is used.

The following description concerns each copyright information set whose video data identifier, encryption necessity, distribution pattern, picture quality, and validity are respectively "Scene01.avi", "No", "Sale", "High", and "Year's End". If the video section between the object start point "00:00:00:00" and the object end point "00:30:00:00" is used, the copyright holder of this video section is ○AH ΔCE and 30 yen needs to be paid to "●● SOCIETY" each time the video section is used for one second. If the video section between the object start point "00:45:00:00" and the object end point "01:00:00:00" is used, the copyright holder of this video section is "■FE ◊HE" and 30 yen needs to be paid to "■FE ◊HE" each time the video section is used for one second. If the video section between the object start point "00:00:00:00" and the object end point "01:00:00:00" is used, the copyright holder of this video section is "♦♦♦Co." and 2000 yen needs to be paid to "♦♦♦Co." regardless of how long the video section is used.

These copyright information sets are, for instance, generated for the case where "♦♦♦Co." produced the video data piece assigned the video data identifier "Scene01.avi", "○OAH ΔCE" appears in the video section between the object start point "00:00:00:00" and the object end point "00:30:00:00", and "■FE ◊HE" appears in the video section between the object start point "00:45:00:00" and the object end point "01:00:00:00". As a result, each of "♦♦♦Co.", "○AH ΔCE", and "■FE ◊HE" holds the copyright (more specifically, a neighbouring right) to the video data piece.

Also, the copyright information table 331 shown in FIG. 6 includes no copyright information set for the video data piece assigned a video data identifier "Scene02.avi". This is because no royalty fee needs to be paid for the video data piece or the video data piece is stored in a public domain. Needless to say, the copyright information table 331 may include copyright information sets whose payee names and standard copyright royalty fees are respectively set as "None" and "0 Yen".

(Copyright Holder Priority Table 341)

The copyright holder priority table 341 is a data table showing the will of each copyright holder concerning the deletion of each corresponding video section during editing.

As shown in FIG. 7, the copyright holder priority table 341 includes at least one copyright holder priority information set, each of which includes a video data identifier, at least one object start point, at least one object end point, and at least one copyright holder priority.

Each video data identifier is an identifier used to identify a video data piece stored in the video data storing unit 104.

The object start points and the object end points are the same information items as the object start points and the object end points in the copyright information table 331. That is, each pair of an object start point and an object end point is used to specify a video section of the video data piece assigned a corresponding video data identifier.

Each copyright holder priority shows whether the video section, which is specified by a corresponding object start point and object end point, of the video data piece assigned a corresponding video data identifier can be deleted during editing. Each copyright holder priority is determined by the copyright holder of a corresponding video section and, if the deletion of the corresponding video section is allowed, the copyright holder priority is set as a deletion priority number.

Here, video sections of a video data piece are deleted in ascending order of the deletion priority numbers. For instance, a video data piece includes a video data section of a deletion priority number "0" and a video data section of a deletion priority number "1", the video data section of the deletion priority number "0" is first deleted and the video data section of the deletion priority number "1" is then deleted.

(6) Copyright Information Updating Unit 113

The copyright information updating unit 113 receives an instruction from the control unit 118 and starts processing.

The copyright information updating unit 113 is achieved by the media input/output unit and the communication unit. With this construction, the copyright information updating unit 113 reads copyright information sets and copyright holder priority information sets recorded on a recording medium, such as a CD-ROM, and obtains copyright information sets and copyright holder priority information sets from the external apparatus via the network bus. Here, the read and obtained copyright information sets and copyright holder priority information sets give the same information items as those in the copyright information table 331 and the copyright holder priority table 341 stored in the copyright information storing unit 105. The copyright information updating unit 113 updates the copyright information table 331 and the copyright holder priority table 341 using the read and obtained copyright information sets and copyright holder priority information sets.

(7) Video Material Display Unit 110

The video material display unit 110 receives an instruction from the control unit 118 and generates and displays a frame of the video material area.

The video material display unit 110 also reads the video material display mode stored in the setting storing unit 116.

If the read video material display mode is to display video materials without the corresponding royalty fees, the video material display unit 110 reads the video data identifier of each video data piece and the representative picture data piece of each video data piece from the video data storing unit 104, generates a representative picture by decoding each read representative picture data piece, and displays each generated representative picture with a corresponding video data identifier in the video material area.

FIG. 4 shows an example of the video material area generated in this video material display mode. In this drawing, the video material area 203a shows each representative picture with a corresponding video data identifier.

If the read video material display mode is to display video materials with the corresponding royalty fees, the video material display unit 110 reads the video data identifier of each video data piece and the representative picture data piece of each video data piece from the video data storing unit 104, generates a representative picture by decoding each read representative picture data, and displays each generated representative picture with a corresponding video data identifier in the video material area. In this video material display mode, the video material display unit 110 also reads each copyright information set, which includes the same video data identifier as one of the read video data identifiers, from the copyright information table 331, selects each copyright information set, which includes the same information as the usage condition information in a usage condition table 351 (described later), from the read copyright information sets. Following this, the video material display unit 110 additionally displays, in the video material area, the object start point, object end point, and standard copyright royalty fee included in each selected copyright information set with a corresponding pair of a representative picture and a video data identifier.

The video material display unit 110 then reads each editing information set, which includes the same video data identifier as one of the displayed video data identifiers, from an editing information table 311 (described later), and additionally displays, in the video material area, the reproduction start point and the reproduction end point included in each read editing information set with corresponding information.

FIG. 5 shows an example of the video material area generated in this video material display mode. In this drawing, the video material area 203b shows a plurality of sets of representative pictures, video data identifiers, object start points, object end points, standard copyright royalty fees, reproduction start points, and reproduction end points.

(8) Editing Information Storing Unit 102

The editing information storing unit 102 is achieved by the hard disc unit and prestores an editing information table 311 and an editor priority table 321. FIG. 8 shows an example of the editing information table 311 and FIG. 9 shows an example of the editor priority table 321.

(Editing Information Table 311)

The editing information table 311 includes at least one editing information set, each of which includes an ID, a video data identifier, a reproduction start point, and a reproduction end point.

Each ID is an identifier assigned to an editing information set.

Each video data identifier is an identifier used to identify a video data piece stored in the video data storing unit 104.

Each pair of a reproduction start point and a reproduction end point is used to specify one video section of the video data piece assigned a corresponding video data identifier. In this respect, the reproduction start points and reproduction end points are the similar information items as the object start points and object end points in the copyright information table 331.

(Editor Priority Table 321)

The editor priority table 321 is a data table similar to the copyright holder priority table 341. That is, the editor priority table 321 shows the will of an editor concerning the deletion of each video section, which is specified by a pair of an object start point and an object end point, of the video data piece assigned a corresponding video data identifier during editing.

The editor priority table 321 includes at least one editor priority information set, each of which includes an ID, a video data identifier, an object start point, an object end point, and an editor priority.

The IDs and video data identifiers are the same information items as those in the editing information table 311.

The object start points and object end points are the same information items as the object start points and object end points in the copyright information table 331. That is, each pair of an object start point and an object end point is used to specify one video section of the video data piece assigned a corresponding video data identifier.

The editor priorities are the similar information item to the copyright holder priorities in the copyright holder priority table 341. That is, each editor priority shows the will of the editor concerning the deletion of the video section specified by a corresponding pair of an object start point and an object end point. If the deletion of a video section is allowed, a corresponding editor priority is set as a deletion priority number. Here, video sections of a video data piece are deleted in ascending order of the deletion priority numbers.

(9) Editing Information Generating Unit 101

The editing information generating unit 101 receives an instruction from the control unit 118 and starts processing.

The editing information generating unit 101 receives a user's selection of a video data identifier, which is assigned to a video data piece that the user wishes to use for a video content, from the video data identifiers displayed on the video material area 203a. The editing information generating unit 101 then receives a user's designation of a reproduction start point and a reproduction end point of the video data piece. Following this, the editing information generating unit 101 assigns an ID to these information (the video data identifier, reproduction start point, and reproduction end point) designated by the user and writes an editing information set, which includes the generated ID, the video data identifier, the reproduction start point, and the reproduction end point, into the editing information table 311 stored in the editing information storing unit 102.

The editing information generating unit 101 then obtains representative picture data of the video data piece from the video data storing unit 104, generates a representative picture by decoding the representative picture data, displays separations representing the reproduction start point and the reproduction end point along the time axis in the pre-reediting area in the time axis editor area, and displays the generated representative picture between the separations.

The editing information generating unit 101 instructs the control unit 118 to calculate the sum of copyright royalty fees.

The editing information generating unit 101 also receives a user's designation of at least one object start point, at least one object end point, and at least one editor priority for the video data identifier selected by the user. The editing information generating unit 101 then writes an editor priority information set, which includes the generated ID, the video data identifier, each object start point, each object end point, and each editor priority, into the editor priority table 321.

The editing information generating unit 101 repeatedly performs the stated processing for each video data identifier selected by the user. That is, the editing information generating unit 101 repeatedly receives a video data identifier from the user, writes information into the editor information table 311, displays the information in the time axis editor area, instructs the control unit 118 to calculate the sum of royalty fees, and receives and writes an editor priority information set into the editor priority table 321 until the user finishes the selection of video data identifiers.

The editing information generating unit 101 also receives a user's designation of a point in time for each video data identifier in the editing information table 311, and outputs each point in time with a corresponding video data identifier to the video reproduction unit 103.

(10) Video Reproduction Unit 103

The video reproduction unit 103 receives each pair of a video data identifier and a point in time for the video data identifier from the editing information generating unit 101, and reads each video data piece, which is assigned one of the received video data identifiers, from the video data storing unit 104. The video reproduction unit 103 then generates moving picture data and audio data by decoding each read video data piece from a corresponding point in time, displays the moving picture data in the video output area, and outputs the audio data to the speakers.

More specifically, if reproducing video data according to the editing information table 311 shown in FIG. 8, the video reproduction unit 103 sequentially reproduces the video data in a file "Scene01.avi" from the reproduction start point "00:10:00:00" to the reproduction end point "00:40:25:00", the video data in a file "Scene03.avi" from the reproduction start point "00:00:00:00" to the reproduction end point "01:00:00:00", and the video data in a file "Scene02.avi" from the reproduction start point "00:32:00:00" to the reproduction end point "00:50:00:00" in this order.

(11) Usage Condition Storing Unit 114

Figure 10:
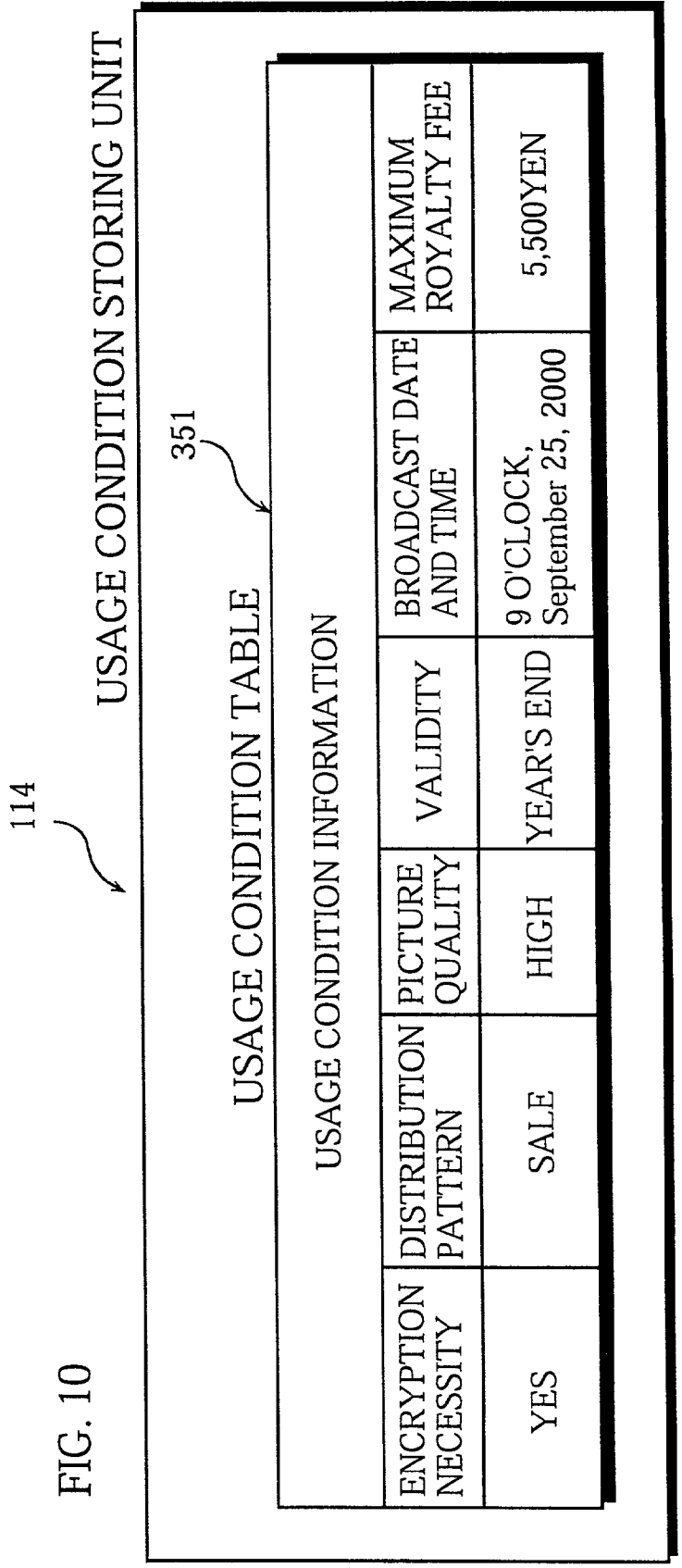
FIG. 10 shows the data structure of a usage condition table.

The usage condition storing unit 114 is achieved by the hard disc unit and stores a usage condition table 351, an example of which is shown in FIG. 10. This table 351 gives information concerning usage conditions for a video content, such as a security level and a distribution pattern (broadcast, sale, and so on)).

More specifically, the usage condition table 351 includes an encryption necessity, a distribution pattern, a picture quality, a validity, a broadcast date and time, and an upper limit.

The encryption necessity, distribution pattern, picture quality, and validity have been described above and so are not described here.

The broadcast date and time is a date and time when the video content, which is currently being edited, will be broadcasted.

The upper limit shows the maximum copyright royalty fee that can be paid for the video content.

(12) Usage Condition Input Unit 115

The usage condition input unit 115 receives an instruction from the control unit 118 and starts processing.

The usage condition input unit 115 receives user's designations of a distribution pattern, an encryption necessity, a picture quality, a validity, a broadcast date and time, and an upper limit. FIG. 11 shows an example of a usage condition input screen with which the user designates the usage conditions described above. As shown in this drawing, the usage condition input screen 210 includes a distribution pattern area 211, an encryption necessity area 212, a picture quality area 213, a validity area 214, a broadcast date and time area 215, and an upper limit area 216.

The distribution pattern area 211 includes various options, such as "DVD sale", "VHS sale", "pay broadcast", "free broadcast", and "Web distribution". The user selects one of these options.

The encryption necessity area 212 includes two options "Yes" and "No", and the user selects one of these options.

The picture quality area 213 includes three options "high", "middle", and "low", and the user selects one of these options.

The validity area 214 includes three options "year's end", "June 2001", and "December 2001", and the user selects one of these options.

After receiving user's designations of a distribution pattern, an encryption necessity, a picture quality, a validity, a broadcast date and time, and an upper limit, the usage condition input unit 115 writes the designated usage conditions into the usage condition table 351 stored in the usage condition storing unit 114.

(13) Royalty Fee Calculation Unit 108

The royalty fee calculation unit 108 receives instructions from the control unit 118 and the reediting unit 106 and starts processing.

The royalty fee calculation unit 108 includes a RAM and stores an interim calculation information table 361, an example of which is shown in FIG. 12. As shown in this drawing, the interim calculation information table 361 includes at least one interim calculation information set, each of which includes a material name, an object start point, an object end point, a standard copyright royalty fee, a copyright holder name, a payee name, a usage start point, and a usage end point.

Each material name is an identification name used to identify a video data piece stored in the video data storing unit 104. Each pair of an object start point and an object end point specifies one video section of the video data piece identified by a corresponding material name. Each video section specified by one pair of an object start point and an object end point correspond to the video section specified by one pair of an object start point and an object end point in the copyright information table 331. The standard copyright royalty fee, copyright holder name, and payee name are the same information items as those in the copyright information table 331 and so are not described here. Each pair of a usage start point and a usage end point specifies a video section, that is to be used for the video content, of the video data piece identified by a corresponding material name.

The royalty fee calculation unit 108 reads the usage condition information from the usage condition table 351 stored in the usage condition storing unit 114 and reads each editing information set from the editing information table 311 stored in the editing information storing unit 102.

The royalty fee calculation unit 108 then reads each copyright information set, which satisfies all of Conditions 1–5 given below, from the copyright information table 331 stored in the copyright information storing unit 105.

<Condition 1> The video data identifier matches that in an editing information set.

<Condition 2> The encryption necessity matches that in the usage condition information.

<Condition 3> The distribution pattern matches that in the usage condition information.

<Condition 4> The picture quality matches that in the usage condition information.

<Condition 5> The validity matches that in the usage condition information.

The royalty fee calculation unit 108 then finds a usage section for each read copyright information set and determines the start point (the usage start point) and the end point (the usage endpoint) of the usage section. Here, each usage section is a section where the video section specified by the object start point and object end point in one of the read copyright information sets overlaps the reproduction section specified by the reproduction start point and reproduction end point in the editing information set that includes the same video data identifier as that in the copyright information set.

The royalty fee calculation unit 108 sets the video data identifier included in the read copyright information sets as a material name. The royalty fee calculation unit 108 then generates an interim calculation information set for each read copyright information set using the material name, information in the copyright information set (an object start point, an object end point, a standard copyright royalty fee, a copyright holder name, and a payee name), and a corresponding usage start point and usage end point. The royalty fee calculation unit 108 writes each generated interim calculation information set into the interim calculation information table 361.

The royalty fee calculation unit 108 repeatedly performs the processing described above for each editing information set in the editing information table 311 stored in the editing information storing unit 102.

The royalty fee calculation unit 108 calculates a copyright royalty fee for each interim calculation information set in the interim calculation information table 361 in the manner described below.

The royalty fee calculation unit 108 checks whether the standard copyright royalty fee in each interim calculation information set is based on an as-used basis or a fixed basis. If the standard copyright royalty fee in an interim calculation information set is based on a fixed basis, the royalty fee calculation unit 108 uses the standard copyright royalty fee in the interim calculation information set as the copyright royalty fee. If the standard copyright royalty fee in an interim calculation information set is based on an as-used basis, the royalty fee calculation unit 108 calculates a usage time according to Formula 1 given below.

Usage Time=Usage End Point−Usage Start Point <Formula 1>

The royalty fee calculation unit 108 then calculates a copyright royalty fee according to Formula 2 given below, where the calculated usage time is multiplied by the standard copyright royalty fee in the interim calculation information set.

Copyright Royalty Fee=Standard copyright royalty fee×Usage Time <Formula 2>

The royalty fee calculation unit 108 calculates the total copyright royalty fee by totaling the copyright royalty fees that should be paid to the same payee, generates a royalty fee information set, which includes a payee name and a total copyright royalty fee, for each payee, and writes each generated royalty fee information set into the royalty fee storing unit 109.

The royalty fee calculation unit 108 then calculates the sum of the total copyright royalty fees that have been calculated for respective payees and displays the calculated sum in the pre-reediting total copyright royalty fee area of the display screen 200.

(14) Royalty Fee Storing Unit 109

Figure 13:
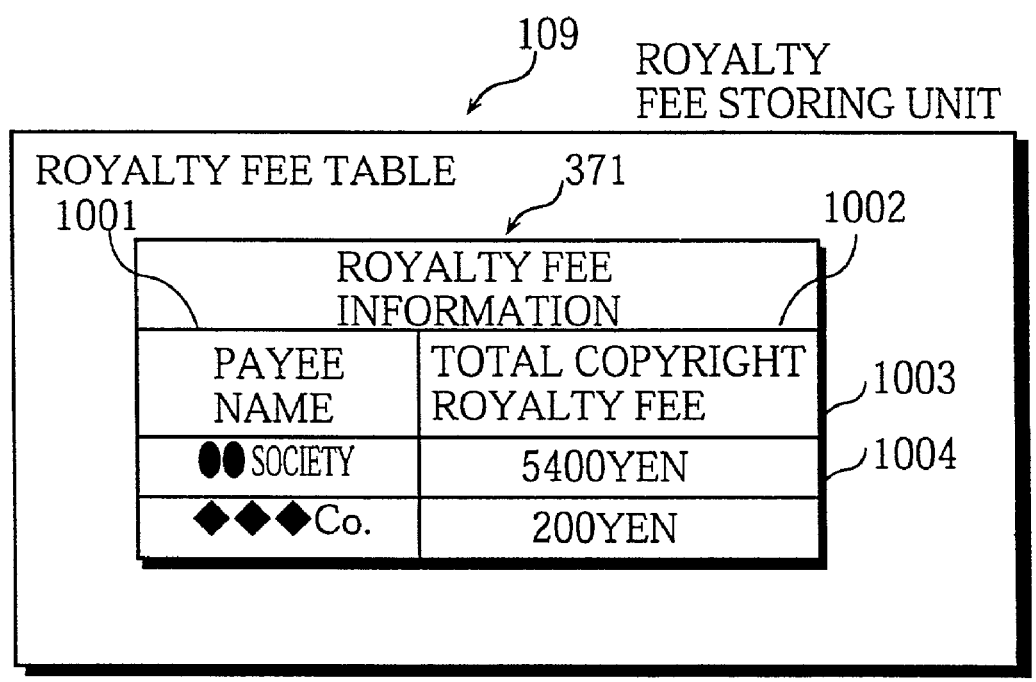
FIG. 13 shows the data structure of a royalty fee table.

The royalty fee storing unit 109 is achieved by a RAM and stores a royalty fee table 371, an example of which is shown in FIG. 13. As shown in this drawing, the royalty fee table 371 includes at least one royalty fee information set, each of which includes a payee name and a total copyright royalty fee.

The payee name and total copyright royalty fee have been described above and so are not described here.

(15) Royalty Fee Information Transmission and Reception Unit 112

The royalty fee information transmission and reception unit 112 receives an instruction from the control unit 118 and starts processing.

The royalty fee information transmission and reception unit 112 reads each royalty fee information set from the royalty fee storing unit 109 and transmits each read royalty fee information set to an external apparatus located at a payee via the network bus.

The royalty fee information transmission and reception unit 112 also receives a message that is transmitted from the external apparatus to notice that the royalty fee information set has been received.

(16) Reediting Information Storing Unit 107

The reediting information storing unit 107 is achieved by a RAM and stores a reediting information table 381, an example of which is shown in FIG. 14.

The reediting information table 381 includes at least one reediting information set, each of which includes an ID, a video data identifier, an object start point, an object end point, at least one reediting start point, at least one reediting end point, at least one copyright holder priority, and at least one editor priority.

The ID, video data identifier, object start point, and object end point in each reediting information set are the same information items as those in the editing information table 311.

Each pair of a reediting start point and a reediting end point specifies one video section of the video data piece assigned a corresponding video data identifier.

The copyright holder priorities are the same information item as those in the copyright holder priority table 341 stored in the copyright information storing unit 105. The editor priorities are the same information item as those in the editor priority table 321 stored in the editing information storing unit 102.

(17) Reediting Unit 106

The reediting unit 106 receives an instruction from the upper limit judging unit 111 and starts processing.

The reediting unit 106 reads each editing information set from the editing information table 311 stored in the editing information storing unit 102 and writes each read editing information set as a reediting information set into the reediting information table 381 stored in the reediting information storing unit 107. At this stage, the reediting unit 106 writes no values for the reediting start point, reediting end point, copyright holder priority, and editor priority in each reediting information set.

The reediting unit 106 then writes at least one reediting start point, at least one reediting end point, at least one copyright holder priority, and at least one editor priority into each reediting information set in the manner described below.

The reediting unit 106 reads a reediting information set from the reediting information table 381 and generates at least one reediting section by dividing the video section, which is specified by the object start point and object end point in the reediting information set, into at least one video section, each of which is specified by an object start point and an object end point in a copyright holder priority information set including the same video data identifier.

The reediting unit 106 then generates at least one reediting section from each generated reediting section by further dividing the generated reediting section into at least one object section, each of which is specified by an object start point and an object end point in an editor priority information set including the same video data identifier.

The reediting unit 106 then relates a copyright holder priority in the copyright holder priority table 341 and an editor priority in the editor priority table 321 to each reediting section generated in this manner and generates a pair of a reediting start point and a reediting end point for each reediting section. The reediting unit 106 then writes the reediting start point, reediting end point, copyright holder priority, and editor priority into a corresponding reediting information set in the reediting information table 381.

The reediting unit 106 repeatedly performs the processing described above for each reediting information set in the reediting information table 381.

In this manner, the reediting unit 106 additionally writes at least one copyright holder priority and at least one editor priority into each reediting information set in the reediting information table 381.

Following this, the reediting unit 106 selects each reediting information set, which includes the lowest copyright holder priority, in the reediting information table 381. The reediting unit 106 then selects each reediting information set, which includes the lowest editor priority, from the reediting information sets previously selected. If a plurality of reediting information sets are selected as a result of the latter selection, the reediting unit 106 selects the reediting information set that is at the top in the reediting information table 381 among the plurality of reediting information sets.

The reediting unit 106 subtracts one minute from the reediting end point in the reediting information set finally selected, overwrites the reediting information set with the subtraction result, and instructs the royalty fee calculation unit 108 to calculate the sum of copyright royalty fees.

If the sum of copyright royalty fees exceeds the upper limit, the upper limit judging unit 111 issues a message, which shows that the sum of copyright royalty fees exceeds the upper limit, to the reediting unit 106. On receiving this message, the reediting unit 106 repeats the stated processing where one minute is subtracted from the reediting end point in the reediting information set finally selected.

If the sum of copyright royalty fees does not exceed the upper limit, the upper limit judging unit 111 issues a message, which shows that the sum of copyright royalty fees does not exceed the upper limit, to the reediting unit 106. On receiving this message, the reediting unit 106 displays each reediting information set, which is included in the reediting information table 381 stored in the reediting information storing unit 107, in the post-reediting area in the time axis editor area 205. The display in the post-reediting area is performed in the same manner as the display in the pre-reediting area.

In FIG. 5, a video section 205a displayed in the pre-reediting area represents a video data part to be deleted. Also, the post-reediting area shows a state where the video section 205a has been deleted.

The reediting unit 106 calculates the sum of total copyright royalty fees and displays the calculated sum in the post-reediting total copyright royalty fee display area of the display screen 200.

The reediting unit 106 then displays a message in the message area of the display screen 200 to ask whether the user allows the editing information table 311 to be overwritten with the reediting information table 381, and receives a user's specification showing whether the overwrite is allowed. If the overwrite is allowed, the reediting unit 106 overwrites the IDs, video data identifiers, reproduction start points, and reproduction end points in the editing information table 311 with the corresponding IDs, video data identifiers, reediting start points, and reediting endpoints in the reediting information table 381. If the overwrite is not allowed, the reediting unit 106 does not performs this overwrite processing.

(18) Upper limit Judging Unit 111

The upper limit judging unit 111 calculates the sum of total copyright royalty fees stored in the royalty fee storing unit 109. The upper limit judging unit 111 then reads the upper limit from the usage condition storing unit 114 and compares the calculated sum with the read upper limit. If the calculated sum exceeds the read upper limit, the upper limit judging unit 111 outputs a message, which shows that the calculated sum exceeds the read upper limit, to the reediting unit 106. On receiving this message, the reediting unit 106 starts the reediting processing.

If the calculated sum does not exceed the read upper limit, the upper limit judging unit 111 outputs a message, which shows that the calculated sum does not exceed the read upper limit, to the reediting unit 106.

<2. Operation of Video Editing Apparatus 10>

The following is a description of the operation of the video editing apparatus 10.

(1) Brief Description of Overall Operation of Video Editing Apparatus 10

Figure 15:
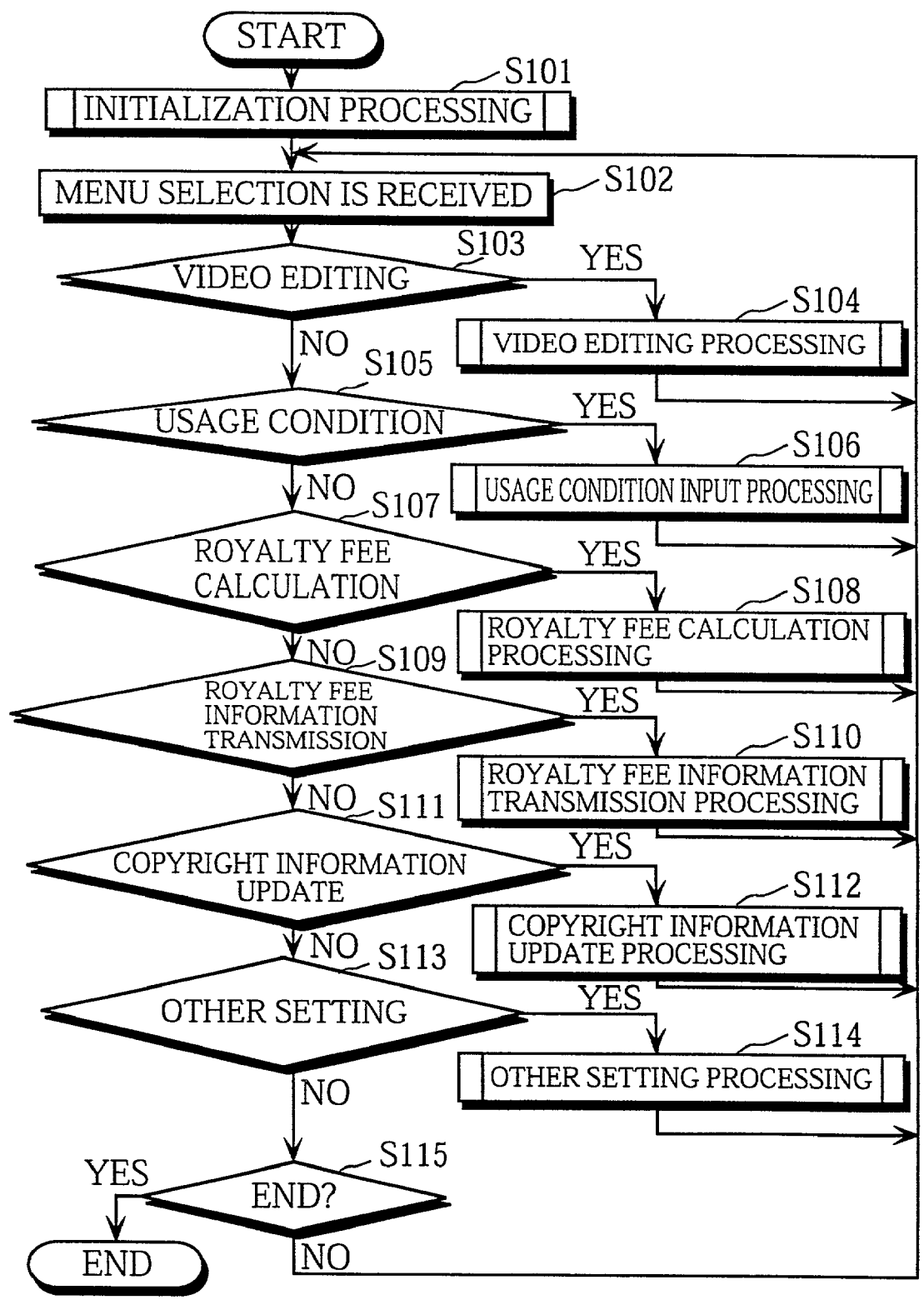
FIG. 15 is a flowchart showing the outline of the overall operation of the video editing apparatus.

The overall operation of the video editing apparatus 10 is briefly described below with reference to the flowchart shown in FIG. 15.

The control unit 118 performs the initialization processing stated above immediately after the video editing apparatus 10 is activated (step S101) and detects which one of the buttons on the menu bar is pushed by the user (step S102).

If detecting that the user pushes the video editing button (step S103), the control unit 118 instructs the editing information generating unit 101 to start processing. After the editing information generating unit 101 completes the processing (step S104), the process returns to step S102.

If detecting that the user pushes the usage condition button (step S105), the control unit 118 instructs the usage condition input unit 115 to start processing. After the usage condition input unit 115 completes the processing (step S106), the process returns to step S102.

If detecting that the user pushes the royalty fee calculation button (step S107), the control unit 118 instructs the royalty fee calculation unit 108 to start processing. After the royalty fee calculation unit 108 completes the processing (step S108), the process returns to step S102.

If detecting that the user pushes the royalty fee information transmission button (step S109), the control unit 118 instructs the royalty fee information transmission and reception unit 112 to start processing. After the royalty fee information transmission and reception unit 112 completes the processing (step S110), the process returns to step S102.

If detecting that the user pushes the copyright information updating button (step Sill), the control unit 118 instructs the copyright information updating unit 113 to start processing. After the copyright information updating unit 113 completes the processing (step S112), the process returns to step S102.

If detecting that the user pushes the other setting button (step S113), the control unit 118 instructs the setting input unit 117 to start processing. After the setting input unit 117 completes the processing (step S114), the process returns to step S102.

If detecting that the user pushes the end button (step S115), the control unit 118 terminates the processing of the video editing apparatus 10. If the control unit 118 detects that the user pushes a button other than the end button (step S115), the process returns to step S102 to repeat the processing described above.

(2) Operation during Initialization Processing

Figure 16:
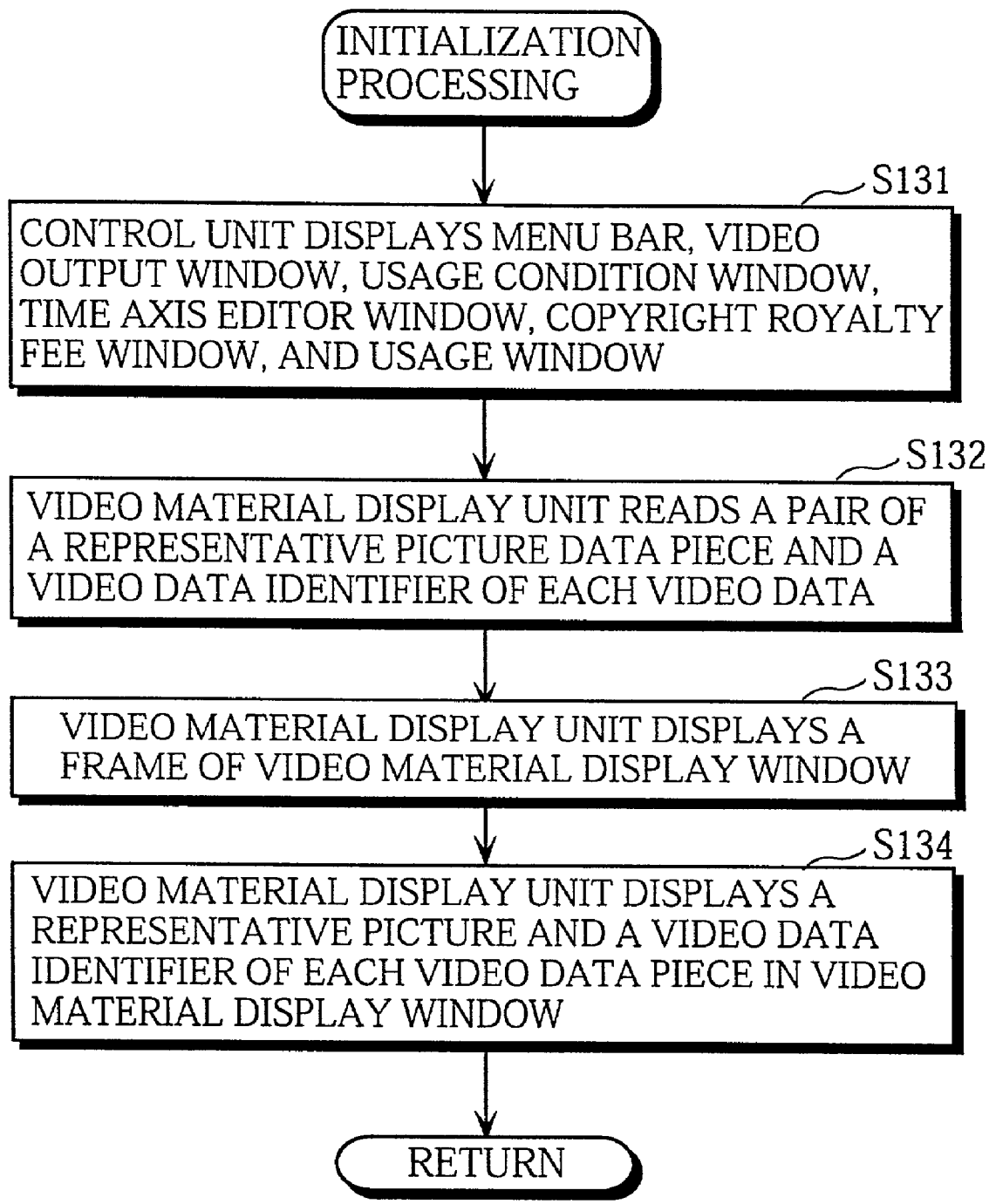
FIG. 16 is a flowchart showing the operation of the video editing apparatus during initialization processing.

The operation of the video editing apparatus 10 during the initialization processing is described below with reference to the flowchart shown in FIG. 16. Note that this flowchart shows the detailed processing performed in step S101 shown in FIG. 15.

During the initialization processing that is performed immediately after the video editing apparatus 10 is activated, the control unit 118 first generates the display screen 200, which includes the menu bar, video output area, usage condition area, time axis editor area, copyright royalty fee area, and message area, and displays the generated display screen 200 (step S131). The control unit 118 then instructs the video material display unit 110 to display video materials. On being instructed by the control unit 118, the video material display unit 110 reads the video material display mode stored in the setting storing unit 116. The video material display unit 110 then reads the video data identifier of each video data piece and the representative picture data piece of each video data piece from the video data storing unit 104 (step S132). The video material display unit 110 then displays a frame of the video material area (step S133), generates a representative picture by decoding each read representative picture data piece, and displays each generated representative picture with a corresponding video data identifier in the video material area. The video material display unit 110 also reads each copyright information set, which includes one of the video data identifiers displayed in the video material area, from the copyright information table 331 and extracts each copyright information set, which gives the same information as the usage condition information in the usage condition table 351, from the read copyright information sets. The video material display unit 110 finally displays, in the video material area, the object start point, object end point, and standard copyright royalty fee in each extracted copyright information set (step S134).

(3) Operation during Video Editing Processing

Figure 17:
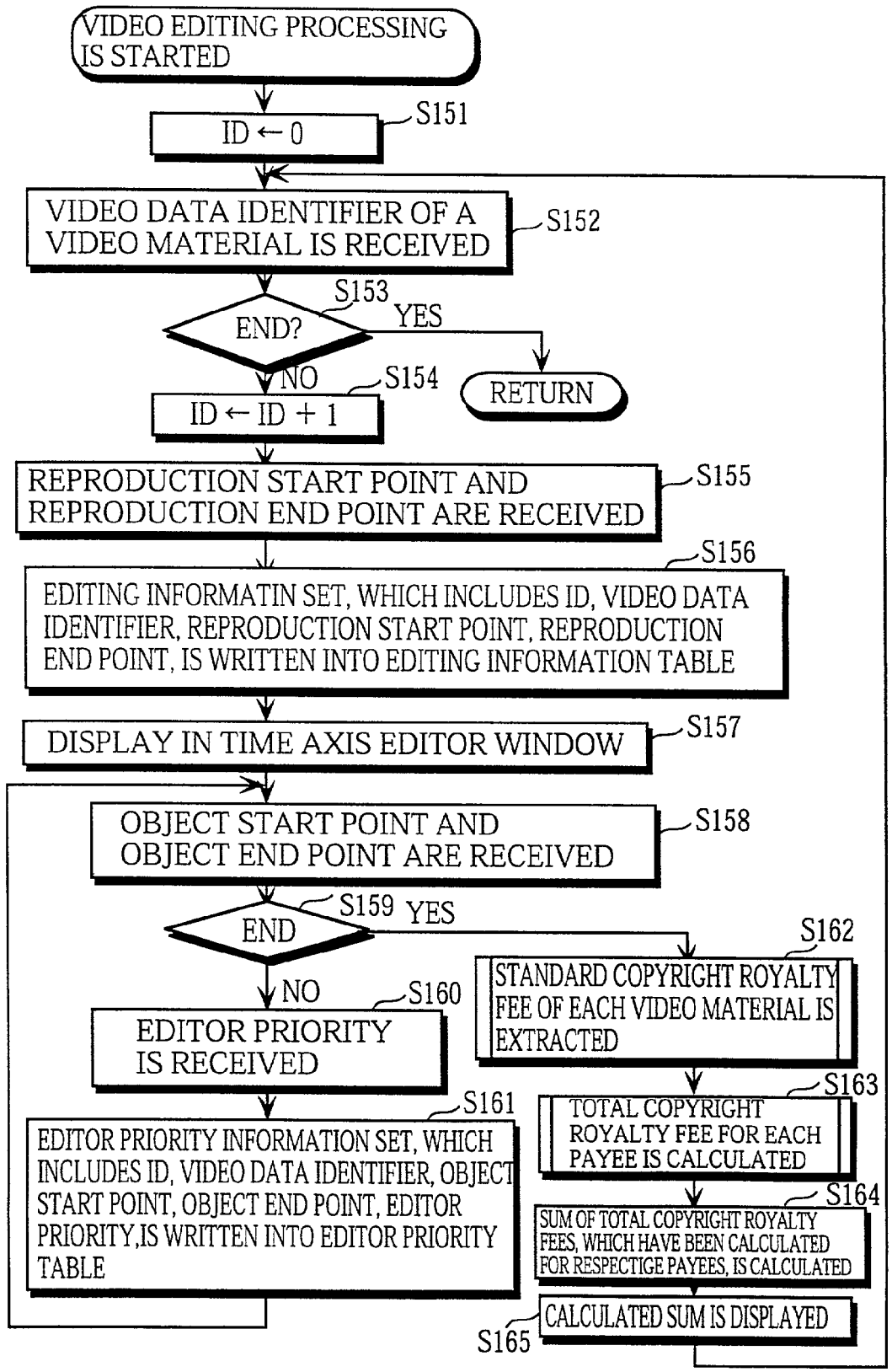
FIG. 17 is a flowchart showing the operation of the video editing apparatus during video editing processing.

The operation of the video editing apparatus 10 during the video editing processing is described below with reference to the flowchart shown in FIG. 17. Note that this flowchart shows the detailed processing performed in step S104 shown in FIG. 15.

The editing information generating unit 101 performs initialization processing by assigning a value "0" to a variable "ID" (step S151).

The editing information generating unit 101 receives a user's selection of a video data identifier, which is assigned to the video data piece that the user wishes to use for the video content, among the video data identifiers displayed in the video material area 203a (step S152). Here, if receiving a user's designation of the end of the video material selection (step S153), the editing information generating unit 101 terminates the processing.

The editing information generating unit 101 then increments the variable ID by one (step S154), receives a user's designation of a reproduction start point and a reproduction end point of the video data piece (step S155), and writes an editing information set, which includes the ID, video data identifier, reproduction start point, and reproduction end point, into the editing information table 311 stored in the editing information storing unit 102 (step S156).

The editing information generating unit 101 obtains the representative picture data of the video data piece assigned the written video data identifier from the video data storing unit 104. The editing information generating unit 101 then generates a representative picture by decoding the obtained representative picture data, displays separations representing the reproduction start point and the reproduction end point along the time axis in the pre-reediting area in the time axis editor area, and displays the generated representative picture between the separations. Following this, the editing information generating unit 101 instructs the royalty fee calculation unit 108 to calculate the sum of copyright royalty fees, and displays the calculated sum in the display screen 200 (step S157).

The editing information generating unit 101 then receives a user's designation of a pair of an object start point and an object end point for the video section between the reproduction start point and the reproduction end point (step S158). If another user's designation of a pair of an object start point and an object end point is to be made for the video section (step S159), the editing information generating unit 101 receives a user's designation of an editor priority (step S160) and writes the ID, the selected video data identifier, the designated object start point, the designated object end point, and the designated editor priority into the editor priority table 321 (step S161). Then, the process returns to step S158 to repeat the processing described above.

After every pair of an object start point and an object end point has been designated for the video section (step S159), the standard royalty fee for the video material is extracted (step S162) and the total copyright royalty fee for each payee is calculated (step S163). The editing information generating unit 101 calculates the sum of the total copyright royalty fees that have been calculated for respective payees (step S164), and displays the calculated sum in the pre-reediting total copyright royalty fee area in the copyright royalty fee area 206 of the display screen 200 (step S165). Then, the process returns to step S152 to repeat the processing described above.

(4) Operation during Processing Where Standard Royalty Fee for Video Material is Extracted The operation of the video editing apparatus 10 during the processing where a standard royalty fee is extracted for each video material to be used is described below with reference to the flowcharts shown in FIGS. 18 and 19. Note that these flowcharts show the detailed processing performed in step S162 shown in FIG. 17.

The royalty fee calculation unit 108 performs initialization processing by assigning a value "1" to a variable "i" (step S600). The royalty fee calculation unit 108 then reads the ith editing information set from the editing information table 311 (step S601). If all editing information set have been read (step S602), the royalty fee calculation unit 108 terminates the processing (step S602).

If there remains at least one editing information set that should be read (step S602), the royalty fee calculation unit 108 performs initialization processing by assigning a value "1" to a variable "j" (step S604). The royalty fee calculation unit 108 then read the jth copyright information set from the copyright information table 331 (step S605). If all copyright information sets have been read (step S606), the royalty fee calculation unit 108 increments the variable i by one (step S618) and the process returns to step S601 to repeat the stated processing.

If there remains at least one copyright information set that should be read (step S606), the royalty fee calculation unit 108 judges whether the video data identifier in the ith editing information set matches that in the jth copyright information set (step S608). If the judgement result in this step is positive, the process proceeds to step S619. If the judgement result in this step is negative, the royalty fee calculation unit 108 increments the variable j by one (step S617) and the process returns to step S605 to repeat the stated processing.

The royalty fee calculation unit 108 judges whether all of the encryption necessity, distribution pattern, picture quality, and validity in the jth copyright information set match those in the usage condition table 351 (step S619). If the judgement result in this step is negative, the process returns to step S617 to repeat the stated processing. If the judgement result in step S619 is positive, the royalty fee calculation unit 108 then judges whether the reproduction start point IN in the ith editing information set is greater than the object start point T1 in the jth copyright information set (step S609). If the judgement result in step S609 is positive, the royalty fee calculation unit 108 uses the reproduction start point IN as the usage start point ftIn (step S610). If the judgement result in step S609 is negative, the royalty fee calculation unit 108 uses the object start point T1 as the usage start point ftIn (step S611).

The royalty fee calculation unit 108 then judges whether the object end point T2 in the jth copyright information set is greater than the reproduction end point OUT in the ith editing information set (step S612). If the judgement result in step S612 is positive, the royalty fee calculation unit 108 uses the reproduction end point OUT as the usage end point ftOut (step S613). If the judgement result in step S612 is negative, the royalty fee calculation unit 108 uses the object end point T2 as the usage end point ftOut (step S614).

The royalty fee calculation unit 108 then judges whether the usage end point ftOut is greater than the usage start point ftIn (step S615). If the judgement result in step S615 is positive, the royalty fee calculation unit 108 writes information in the jth copyright information set, the usage start point ftIn, and the usage end point ftOut into the interim calculation information table 361 (step S616). Then the process returns to step S617. If the judgement result in step S615 is negative, the process returns to step S617 to repeat the stated processing.

In this manner, the interim calculation information table 361 shown in FIG. 12 is generated.

(5) Operation during Processing Where Total Copyright Royalty Fee for Each Payee is Calculated The operation of the video editing apparatus 10 during the processing where a total copyright royalty fee for each payee is calculated is described below with reference to the flowchart shown in FIG. 20. Note that this flowchart shows the detailed processing performed in step S163 shown in FIG. 17.

The royalty fee calculation unit 108 initializes the royalty fee table 371 (step S712) and assigns a value "1" to a variable "i" (step S700).

The royalty fee calculation unit 108 then reads the ith interim calculation information set from the interim calculation information table 361 (step S701). If all interim calculation information sets have been read (step S702), the royalty fee calculation unit 108 terminates this processing.

If there remains at least one interim calculation information set that should be read (step S702), the royalty fee calculation unit 108 performs initialization processing by assigning a value "1" to a variable "j" (step S704) and reads the jth royalty fee information set from the royalty fee table 371 (step S705). If the royalty fee table 371 does not include the jth royalty fee information set, that is, if no royalty fee information set remains in the royalty fee table 371 (step S706), the royalty fee calculation unit 108 calculates a copyright royalty fee Y1 from the ith interim calculation information set (step S713). The royalty fee calculation unit 108 writes a royalty fee information set, which includes the payee name (hereinafter, "payee A") in the ith interim calculation information set and the copyright royalty fee Y1 (corresponding to a total copyright royalty fee), into the royalty fee table 371 (step S709) and increments the variable i by one (step S711). Then the process returns to step S701 to repeat the stated processing.

If the royalty fee table 371 includes the jth royalty fee information set (step S706), the royalty fee calculation unit 108 judges whether the payee A in the ith interim calculation information set matches the payee name (hereinafter, "payee B") in the jth royalty fee information set (step S708). If the judgement result in this step is negative, the royalty fee calculation unit 108 increments the variable j by one (step S712) and the process returns to step S705 to repeat the stated processing.

If the judgement result in step S708 is positive, the royalty fee calculation unit 108 calculates the copyright royalty fee Y1 (step S714), adds the calculated copyright royalty fee Y1 to the total copyright royalty fee Y in the jth royalty fee information set (step S710), increments the variable i by one, and repeats the stated processing from step S701.

In this manner, a total copyright royalty fee is calculated for each payee and is stored in the royalty fee table 371 shown in FIG. 13.

(6) Operation during Usage Condition Input Processing

Figure 21:
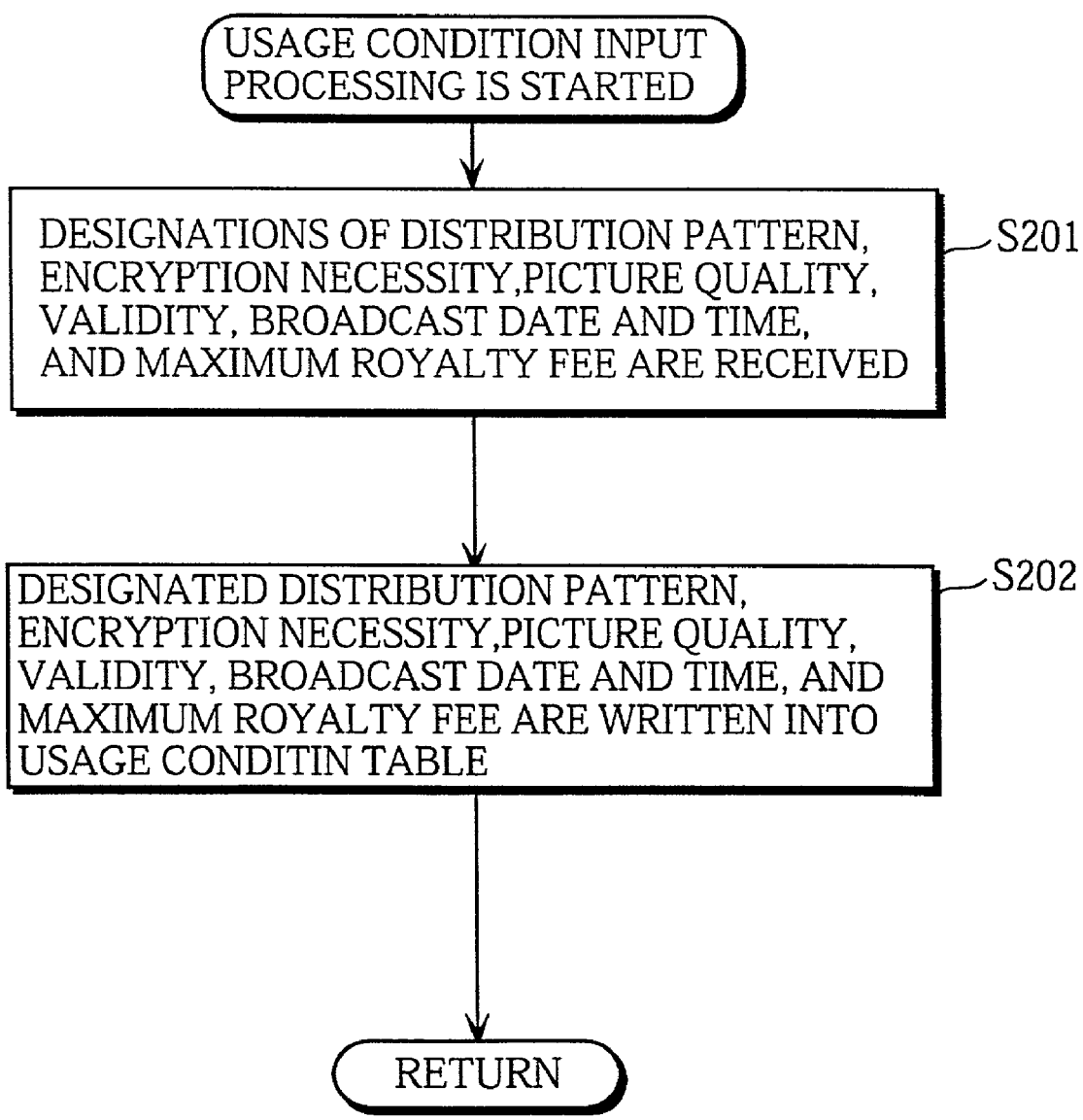
FIG. 21 is a flowchart showing the operation of the video editing apparatus during the processing where usage conditions are designated.

The operation of the video editing apparatus 10 during the processing where usage conditions are designated is described below with reference to the flowchart shown in FIG. 21. Note that this flowchart shows the detailed processing performed in step S106 shown in FIG. 15.

The usage condition input unit 115 receives user' designations of a distribution pattern, an encryption necessity, a picture quality, a validity, a broadcast date and time, and an upper limit (step S201) and writes the user' designations into the usage condition table 351 stored in the usage condition storing unit 114 (step S202).

(7) Operation during Royalty Fee Calculation Processing

Figure 22:
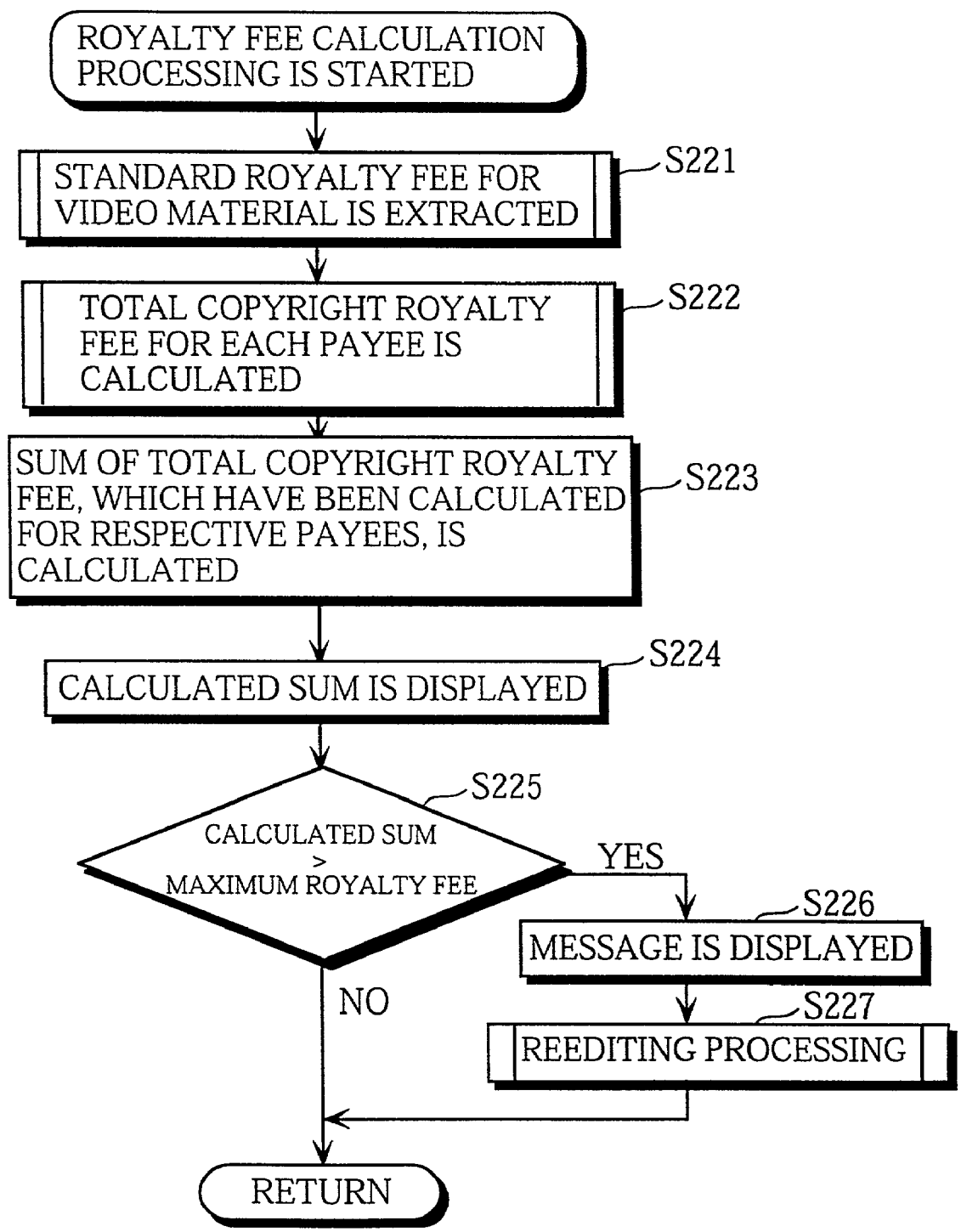
FIG. 22 is a flowchart showing the operation of the video editing apparatus during the processing where royalty fees are calculated.

The operation of the video editing apparatus 10 during the processing where royalty fees are calculated is described below with reference to the flowchart shown in FIG. 22. Note that this flowchart shows the detailed processing performed in step S108 shown in FIG. 15.

The royalty fee calculation unit 108 extracts a standard royalty fee for each video material to be used (step S221), calculates a total copyright royalty fee for each payee (step S222), calculates the sum of the total copyright royalty fees that have been calculated for respective payees (step S223), and displays the calculated sum (step S224). The upper limit judging unit 111 judges whether the calculated sum exceeds the upper limit (step S225). If the judgement result in this step is positive, the royalty fee calculation unit 108 displays a message, which shows that the calculated sum exceeds the upper limit, in the message area 207 (step S226) and the reediting unit 106 performs the reediting processing.

Figure 18:
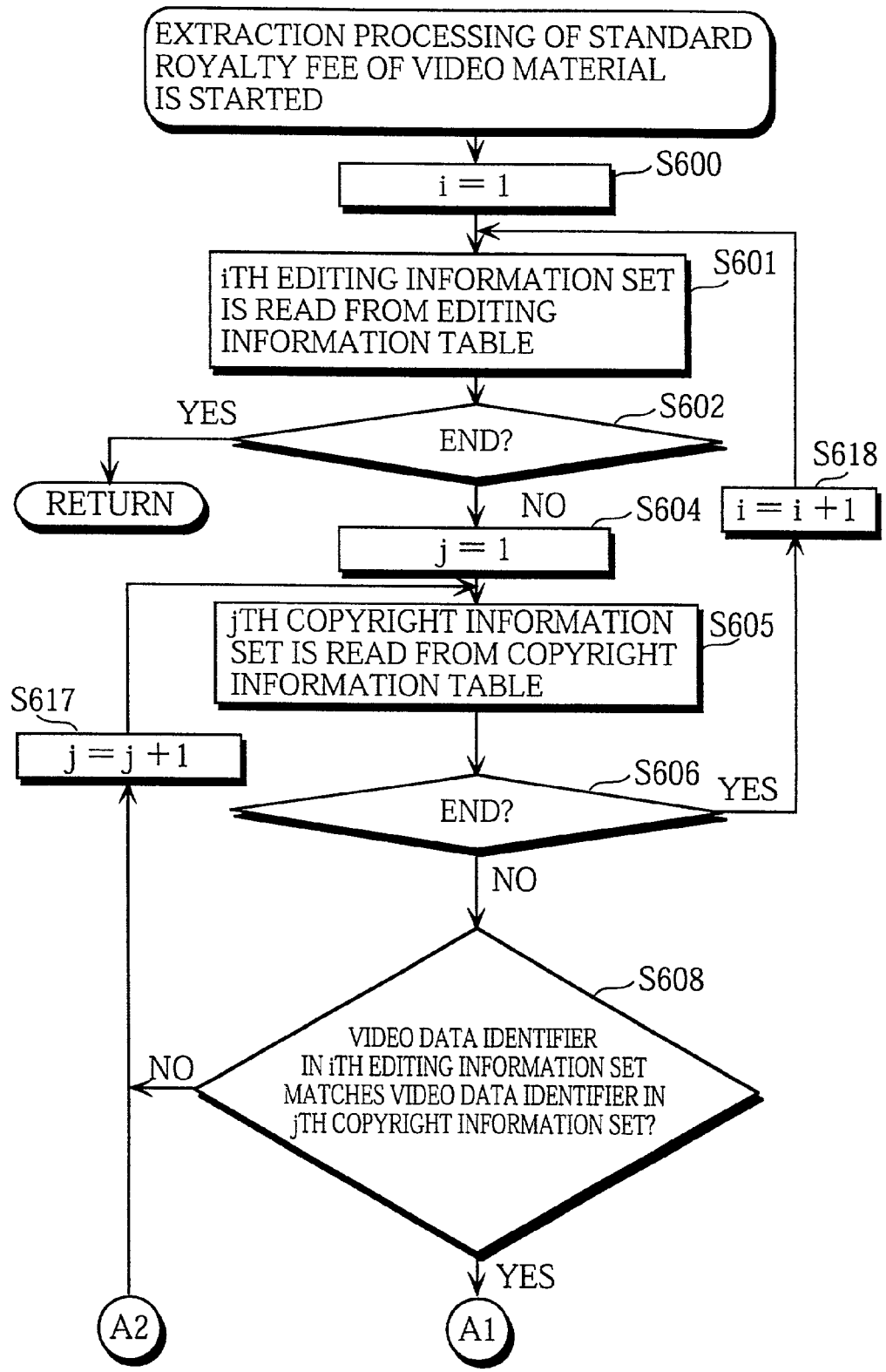
FIG. 18 is a flowchart showing the operation of the video editing apparatus during the processing where a standard royalty fee is extracted for each video material, this flowchart continuing to FIG. 19.
Figure 19:
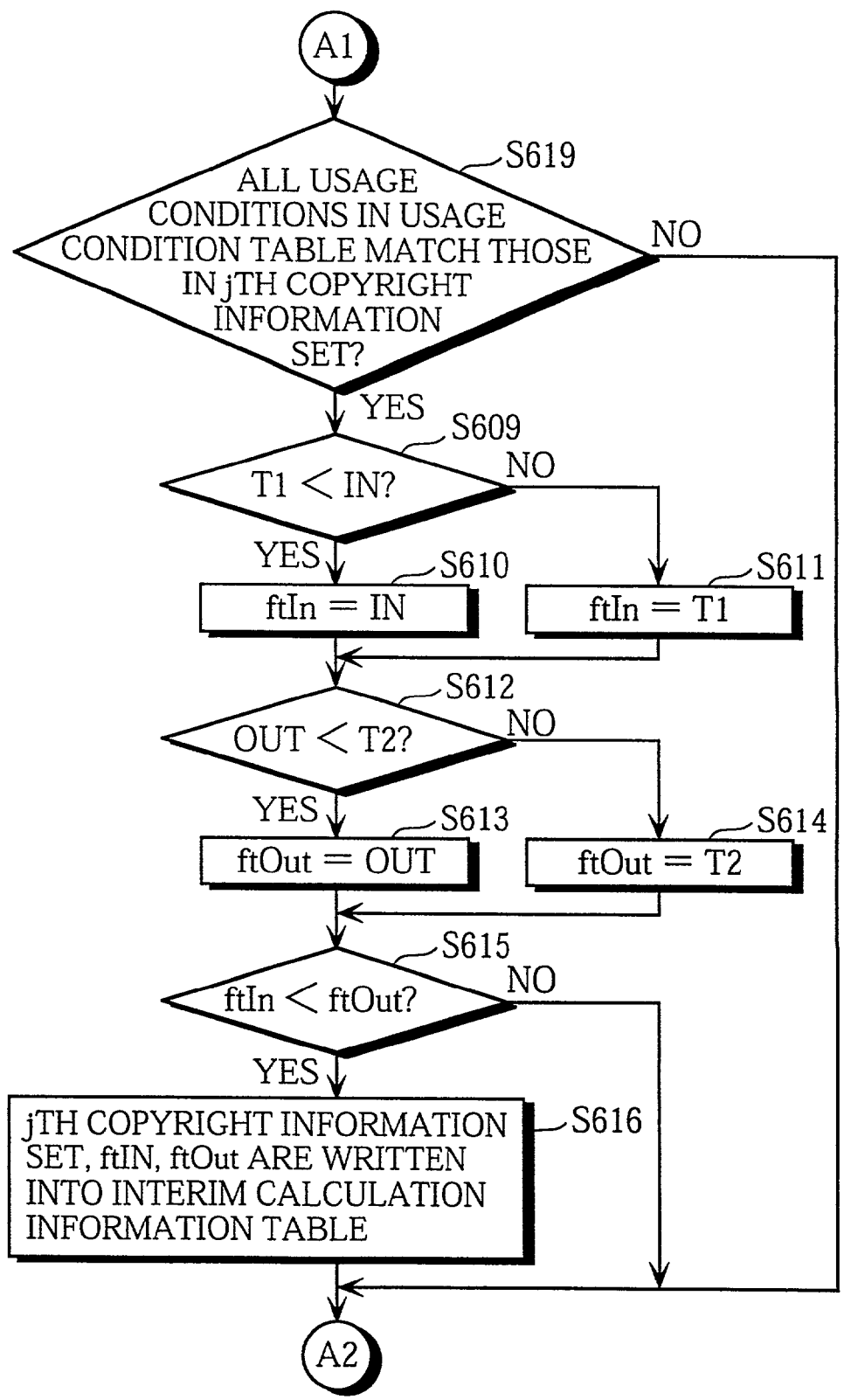
FIG. 19 is a flowchart showing the operation of the video editing apparatus during the processing where a standard royalty fee is extracted for each video material, this flowchart continuing from FIG. 18.
Figure 20:
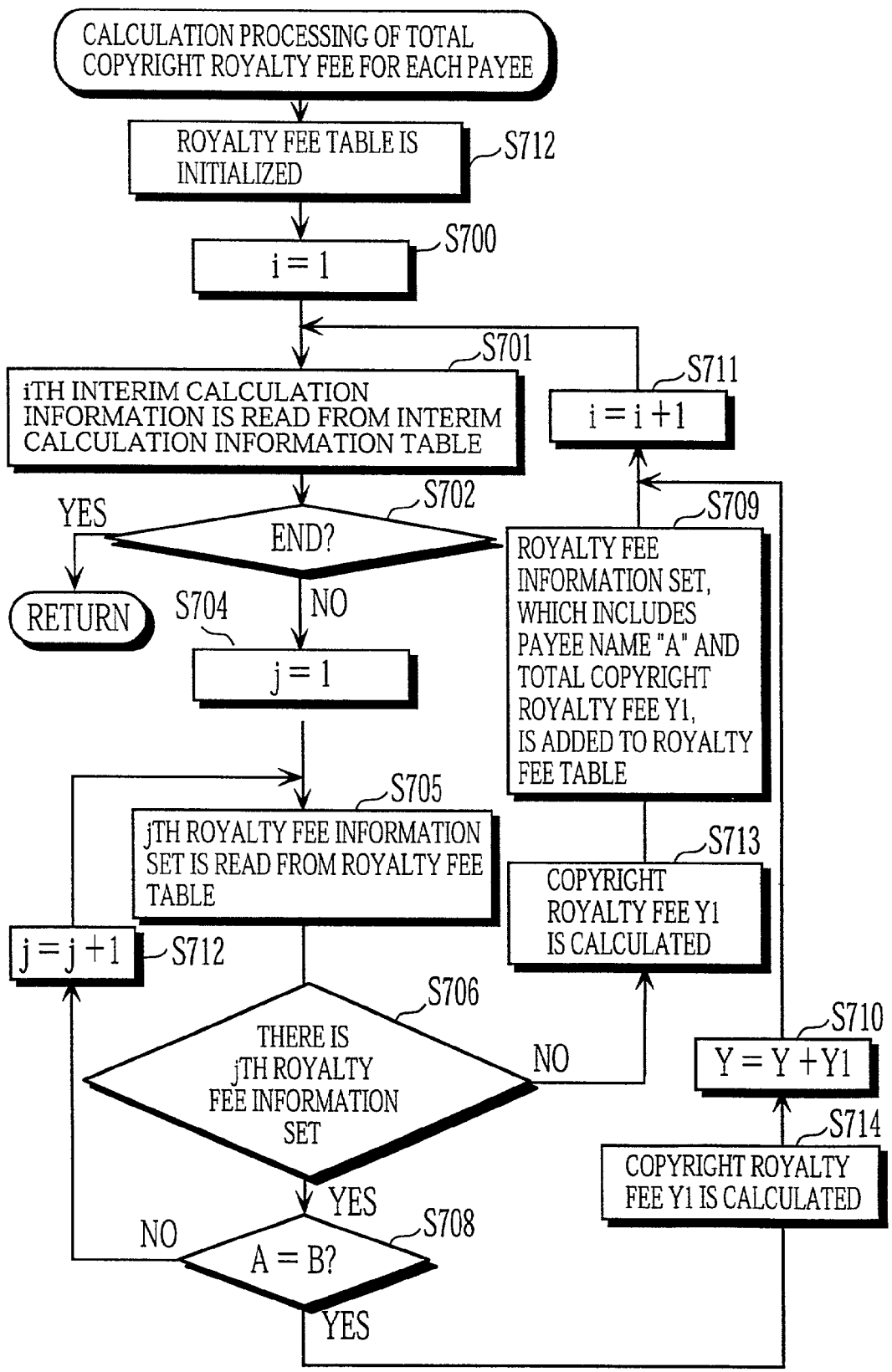
FIG. 20 is a flowchart showing the operation of the video editing apparatus during the processing where a total copyright royalty fee is calculated for each payee.

Here, the detailed processing performed in steps S221 and S222 are shown in the flowcharts shown in FIGS. 18, 19, and 20.

(8) Operation during Reediting Processing

Figure 23:
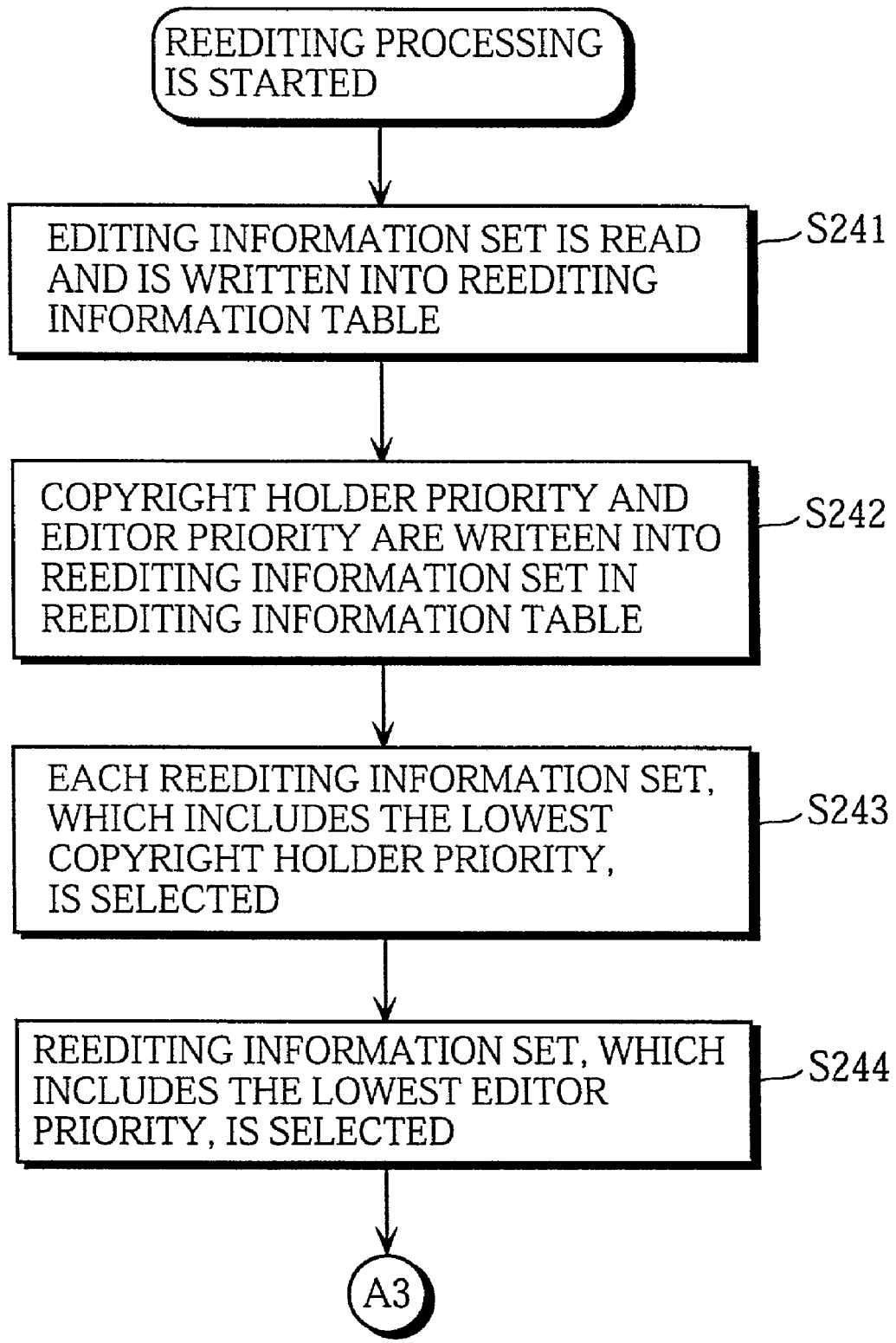
FIG. 23 is a flowchart showing the operation of the video editing apparatus during reediting processing, this flowchart continuing to FIG. 24.
Figure 24:
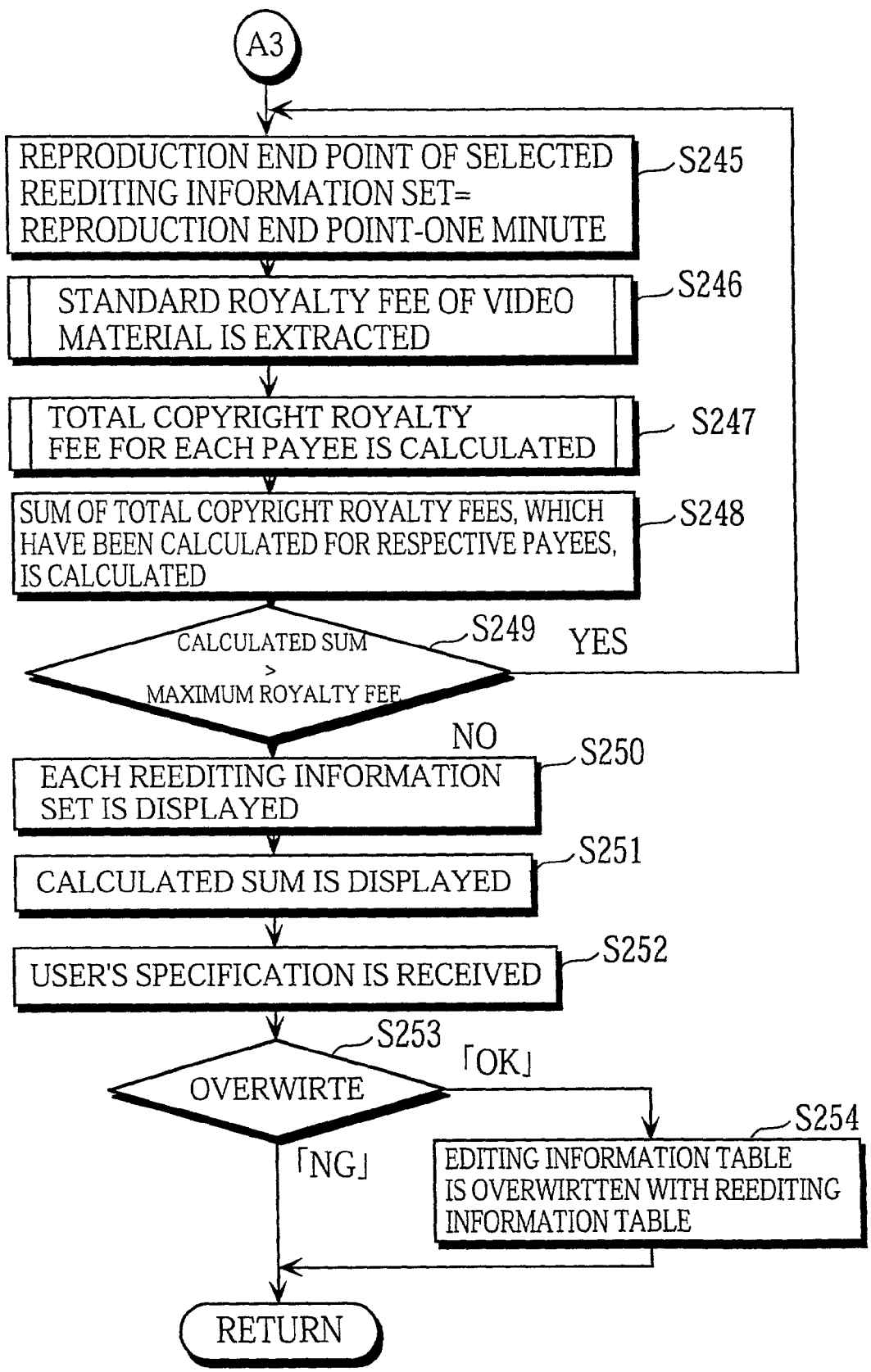
FIG. 24 is a flowchart showing the operation of the video editing apparatus during reediting processing, this flowchart continuing from FIG. 23.

The operation of the video editing apparatus 10 during the reediting processing is described below with reference to the flowcharts shown in FIGS. 23 and 24. Note that these flowcharts show the detailed processing performed in step S227 shown in FIG. 22.

The reediting unit 106 reads each editing information set from the editing information table 311 stored in the editing information storing unit 102 and writes each read editing information set as a reediting information set into the reediting information table 381 stored in the reediting information storing unit 107 (step S241).

The reediting unit 106 then writes at least one reediting start point, at least one reediting end point, at least one copyright holder priority, and at least one editor priority into each reediting information set in the reediting information table 381 (step S242).

The reediting unit 106 selects each reediting information set, which includes the lowest copyright holder priority, from the reediting information table 381 (step S243) and selects a reediting information set, which includes the lowest editor priority, from the selected reediting information sets (step S244).

The reediting unit 106 subtracts one minute from the reediting end point in the reediting information set finally selected, overwrites the reediting information set with the subtraction result (step S245), and instructs the royalty fee calculation unit 108 to calculate a total copyright royalty fee for each payee. The royalty fee calculation unit 108 extracts a standard royalty fee for each video material to be used (step S246) and calculates a total copyright royalty fee for each payee (step S247). The reediting unit 106 calculates the sum of the total copyright royalty fees that have been calculated for respective payees (step S248) and the upper limit judging unit 111 judges whether the calculated sum exceeds the upper limit (step S249). If the judgement result in this step is positive, the process returns to step S245 to repeat the stated processing.

If the judgement result in step S249 is negative, the reediting unit 106 displays each reediting information set in the reediting information table 381 in the post-reediting area in the time axis editor area 205 (step S250). The reediting unit 106 also calculates the sum of the total copyright royalty fees that have been calculated for respective payees and displays the calculated sum in the post-reediting total copyright royalty fee display area of the display screen 200 (step S251).

The reediting unit 106 then displays a message in the message area of the display screen 200 to ask whether the user allows the editing information table 311 to be overwritten with the reediting information table 381, and receives a user's specification showing whether the overwrite is allowed (step S252). If the overwrite is allowed (step S253), the reediting unit 106 overwrites the IDs, video data identifiers, reproduction start points, and reproduction end points in the editing information table 311 with the corresponding IDs, video data identifiers, reediting start points, and reediting end points in the reediting information table 381 (step S254). If the overwrite is not allowed (step S253), the reediting unit 106 does not perform this overwrite processing.

(9) Operation during Other Setting Processing

Figure 25:
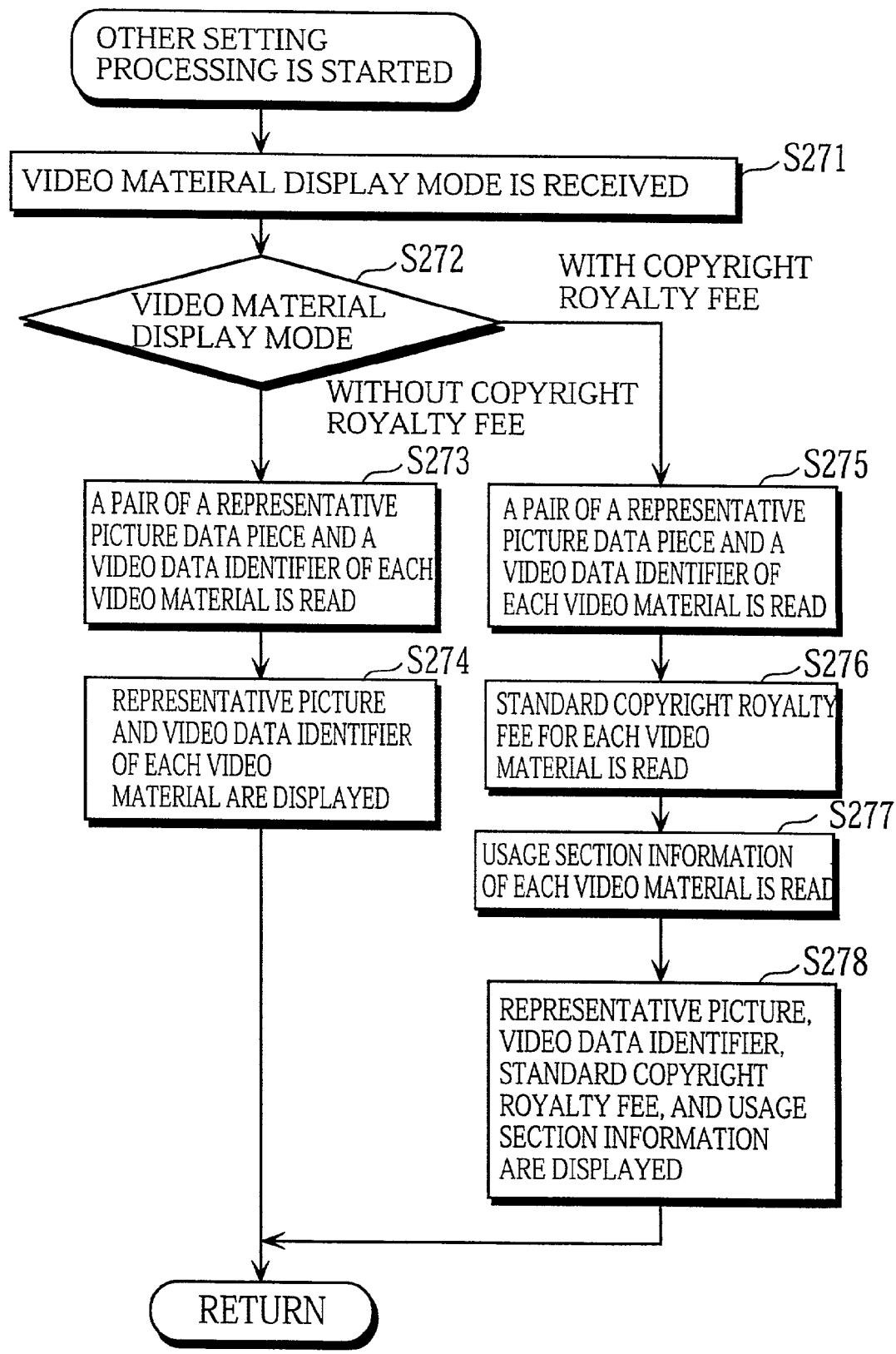
FIG. 25 is a flowchart showing the operation of the video editing apparatus during the processing where other settings are designated.

The operation of the video editing apparatus 10 during the processing where other settings are designated is described below with reference to the flowchart shown in FIG. 25. Note that this flowchart shows the detailed processing performed in step S114 shown in FIG. 15.

The setting input unit 117 receives a user's designation of a video material display mode and changes the video material display mode in the setting storing unit 116 according to the user's designation (step S271).

The video material display unit 110 then reads the video material display mode from the setting storing unit 116. If the read video material display mode is to display video materials without the corresponding royalty fees (step S272), the video material display unit 110 reads the video data identifier of each video data piece and the representative picture data piece of each video data piece from the video data storing unit 104 (step S273), generates a representative picture by decoding each read representative picture data piece, and displays the generated representative picture with a corresponding video data identifier in the video material area (step S274).

If the read video material display mode is to display video materials with corresponding royalty fees (step S272), the video material display unit 110 reads the video data identifier of each video data piece and the representative picture data piece of each video data piece from the video data storing unit 104, generates a representative picture by decoding each read representative picture data piece (step S275). The video material display unit 110 also reads each copyright information set, which includes a video data identifier that is the same as one of the read video data identifiers, from the copyright information table 331 and extracts each copyright information set, which includes the same information as the usage condition information in the usage condition table 351, from the read copyright information sets (step S276). The video material display unit 110 further reads each editing information set, which includes a video data identifier that is the same as one of the read video data identifiers, from the editing information table 311 (step S277). Finally, in the video material area, the video material display unit 110 displays each pair of a representative picture and a video data identifier with (1) the object start point, the object end point, and the standard copyright royalty fee in each corresponding copyright information set and (2) the reproduction start point and reproduction end point included in a corresponding editing information set (step S278).

<3. Conclusion>

Video materials are granted various copyrights, such as the copyrights for their producers and performers. Therefore, if a video content is produced by editing copyrighted video materials and is broadcasted or recorded onto recording media for the purpose of distribution or sale, the producer of the video content needs to be licensed by the copyright holders to use the video materials or to pay royalty fees for the video materials to the copyright holders.

If the video content producer also produces video materials for the video content by themselves, the calculation of copyright royalty fees becomes simple. As a result, in some cases, it is enough for the video content producer to calculate the total copyright royalty fee for each video content. In recent years, however, the number of broadcast channels has increased, and more and more video contents are being distributed via the Internet. This makes it difficult for video content producers to produce video materials, which are used for video contents, by themselves. As a result, various enterprises having different styles and different scales have been founded to provide video materials.

If producing video contents from video materials provided by such enterprises, the video content producers need to perform intricate calculation of copyright royalty fees for the video materials, as distinct from the case where the video content producers prepare video materials by themselves. This is because the copyright royalty fee for a video material frequently changes due to various conditions of the video material, such as the validity (in the case of sport video material, for instance), the performers, the periods during which the performers appear, the distribution pattern (broadcasting or selling on DVD or other recording media), and the security level (whether the video material needs to be encrypted). In this case, however, it becomes unnecessary for the video content producers to be licensed by copyright holders to use copyrighted video materials. That is, the video content producers can freely use the video materials by paying the appropriate copyright royalty fees to the copyright holders.

Against this backdrop, video content producers increasingly wish to estimate the royalty fees for video contents while producing the video contents by editing copyrighted video materials. The present invention was made to satisfy such needs of the video content producers.

As described above, during editing, the video editing apparatus 10 extracts copyright information sets corresponding to each video data piece, which the user wishes to use for a video content, from the copyright information table 331, calculates the copyright royalty fee for each video data piece to be used for the video content, and calculates and displays the total copyright royalty fee for the video content.

Also, the video editing apparatus 10 displays each video material with a corresponding copyright information set. This allows the user to select each video material to be used by checking the copyright royalty fee for the video material. For instance, if it is found that the sum of copyright royalty fees exceeds an upper limit during editing, scenes of performers, for whom higher royalty fees should be paid, may be given higher priorities during deletion. In this case, the total copyright royalty fee for a video content can be efficiently reduced. Also, scenes of performers, for whom lower royalty fees should be paid, may be given higher priorities during deletion. In this case, scenes, which are not so important, can be deleted. Further, a list of scenes of performers, for whom low royalty fees should be paid, may be displayed in the video material area.

Further, because the video editing apparatus 10 calculates the sum of copyright royalty fees in real time, the user can confirm the current sum of copyright royalty fees while producing a video content by editing video data pieces.

Also, the video editing apparatus 10 uses a standard copyright royalty fee for each video material according to various conditions, such as whether the video material is used for the purpose of sale, whether the video material is encrypted before distribution, and how long does the broadcast date and time of the video material lag behind the editing date and time.

Also, the video editing apparatus 10 generates an editing result, that is, a list of copyright information sets corresponding to video materials used for a video content. Therefore, it is unnecessary for the video editing apparatus 10 to separately generate such a list.

Also, a budget for copyright royalty fees (the upper limit) is prestored in the video editing apparatus 10. Therefore, if the sum of copyright royalty fees that should be paid exceeds the prestored budget, the video editing apparatus 10 informs the user. Also, in this case, the video editing apparatus 10 deletes parts of video materials so that the sum of copyright royalty fees becomes no more than the prestored budget.

Also, the video editing apparatus 10 deletes parts of video materials according to the wills of copyright holders and video content editors. That is, the video editing apparatus 10 deletes video material parts other than those that the copyright holders and video content editors wish to leave as they are.

Also, as described above, the video editing apparatus 10 registers information concerning copyright royalty fees at external apparatuses located at payees via the communication unit. This allows the video content editor to pay copyright royalty fees at the same time as the video content is broadcasted.

Also, because the video editing apparatus 10 includes the copyright information updating unit that updates copyright information, the video content editor can use the latest copyright information. For instance, the video content editor can pay the currently lowered copyright royalty fees for performers appearing in a repeated broadcast program.

<4. Modifications>

(1) Although the above embodiment is described using specific usage conditions, such as the distribution pattern (DVD sale or pay broadcast), any other usage conditions may be used. For instance, the type of media that store video contents may also be used as a usage condition. Also, although being classified into three levels "high", "middle", and "low" in the embodiment, the picture quality of each video material may be classified according to various profile regulations.

Also, the distribution methods are limited to broadcast and sale in the embodiment, any other distribution methods, such as test-listen, distribution, and free-of-charge distribution, may be used. Further, any other usage conditions, such as the broadcast area (nationwide/local) of a video content or the number of times when a video content can be copied, may additionally be used.

(2) It does not matter whether the editing information table is generated only once or is updated in accordance with the instruction from the user to the editing information generating unit. Also, in the embodiment, each of the reproduction start point and the reproduction end point is represented by a time value (an hour, a minute, and a second) and a frame number. However, the reproduction start point and the reproduction end point may be represented by any other values, such as the number of bytes from a video data recording start point, so long as parts of video data pieces can be specified with the values.

Each editing information set may include information concerning effects, such as mosaic.

(3) Each video data piece is recorded using a moving picture camera or a VTR (videotape recorder), is assigned a video data identifier (such as Scene01.avi), and is stored in the video data storing unit 104 with the assigned identifier. A video data identifier other than a file name may be assigned to each video data piece, so long as each video data piece can be identified. For instance, a numeric ID or a recording start address in the video data storing unit may be assigned to each video data piece. Also, each video data piece may be obtained via a network and be assigned a video data identifier that is a network address, such as a URL.

(4) The above embodiment is described with reference to FIG. 6 showing an example of the copyright information table 331. However, the copyright information table 331 may further include information concerning licenses for the use of copyrighted materials and detailed information concerning payees (such as the addresses of the payees).

It should be noted here that the copyright information table 331 includes a copyright information set for each combination of encryption necessity, distribution pattern, picture quality, and validity, although only part of the copyright information sets are shown in FIG. 6.

(5) In the embodiment, the copyright information table 331 shown in FIG. 6 is used only to calculate copyright royalty fees. However, the table 331 may also be displayed on the display unit to more efficiently provide the user with information.

Also, in the video material area, the video material display unit 110 may further display a copyright royalty fee calculated for each video material with a corresponding video material.

(6) As described above, the royalty fee information transmission and reception unit 112 transmits information concerning copyright royalty fees to the external apparatuses located at payees via a communication system (such as a network) to register the information at the external apparatuses. If the video contents reproduced by the video reproduction unit 103 are broadcasted as they are, for instance, this operation may be performed in parallel with the end of a broadcast.

Also, this operation may be performed at any other timings. For instance, the copyright royalty fee of each video data piece may be sequentially transmitted and registered at the timing when the broadcast of each video data piece is completed. Also, all copyright royalty fees may be registered by one operation at the end of a month.

Also, to prevent the unauthorized use of copyrighted materials, the storing of copyrighted materials into the video data storing unit and the display of a list of copyrighted materials may be prohibited before billing data is registered in the video editing apparatus 10.

(7) As described above, the copyright information updating unit 113 updates the copyright information table stored in the copyright information storing unit 105 using information transmitted from an external input unit, such as a communication unit. For instance, the copyright information updating unit 113 may download copyright information from a specific URL via the Internet and update the copyright information table using the downloaded copyright information. Also, the copyright information updating unit 113 may update the copyright information table stored in the copyright information storing unit 105 using a unit for reading recording media, such as floppy disks, optical discs, semiconductor memories, and ROMs, that store the latest copyright information. Further, the user of the video editing apparatus 10 may directly input copyright information using a keyboard.

(8) The copyright information described above and corresponding video data may be recorded on the same recording medium (such as, an optical disc) and be provided to the user of the video editing apparatus 10.

It should be noted here that in the above embodiment, each video data piece includes both of an picture data piece and an audio data piece. However, each video data piece may include only one of a picture data piece and an audio data piece.

(9) In the above embodiment, the reediting unit deletes part of one minute from a video data piece. However, the time length of the video data part deleted by the reediting unit is not limited to one minute.

The time length of the video data part deleted by the reediting unit may be changed according to the ratio of the sum of copyright royalty fees to the upper limit. For instance, if the ratio of the sum of copyright royalty fees to the upper limit exceeds 150%, the reediting unit deletes part of five minutes from a video data piece; if the ratio of the sum of copyright royalty fees to the upper limit exceeds 120%, the reediting unit deletes part of three minutes from a video data piece; and if the ratio of the sum of copyright royalty fees to the upper limit exceeds 110%, the reediting unit deletes part of one minute from a video data piece. By changing the time length of a deleted video data part according to the ratio of the sum of copyright royalty fees to the upper limit, the reediting unit can speedily reedit video data pieces so that the sum of copyright royalty fees does not exceed the upper limit.

Also, if the copyright royalty fee for the video data piece whose part is to be deleted is calculated on a fixed basis, the reediting unit may delete the video data piece in its entirety and recalculate the sum of copyright royalty fees.

Further, the reediting unit may select a video data piece, from which part is to be deleted, from video data pieces whose copyright royalty fees are not calculated on a fixed basis.

(10) In the above embodiment, each copyright royalty fee is calculated on an as-used basis or a fixed basis. However, if the same video material is repeatedly used, the user may sign a contract with the copyright holder to discount the copyright royalty fee according to how many times the video material is used, and the copyright royalty fee may be calculated according to this contract. In this case, the standard copyright royalty fee is reduced according to the increase in the number of times when the video material is used.

(11) The present invention may be achieved by a method that realizes the functions of the video editing apparatus 10. Also, the present invention may be achieved by a computer program for having a computer realize such a method. Further, the present invention may be achieved by digital signals of such a computer program.

The present invention may be achieved by a computer-readable recording media, such as floppy disks, hard discs, CD-ROMs, MOs, DVDs, DVD-ROMs, DVD-RAMs, and semiconductor memories, which store the computer program or the digital signals. Also, the present invention may be achieved by the computer program or the digital signals recorded on the recording media.

Also, the present invention may be achieved by transmitting the computer program or the digital signals via a telecommunication line, a wireless communication line, a cable communication line, or a network such as the Internet.

Further, the present invention may be achieved by a computer system that includes a microprocessor and a memory that stores the computer program. In this case, the computer system achieves the functions of the video editing apparatus 10 by executing the computer program stored in the memory using the microprocessor.

Also, the present invention may be achieved by a separated computer system by delivering the recording medium, which stores the computer program or the digital signals, to the separated computer system or transferring the computer program or the digital signals to the separated computer system via the network.

(12) All or some of the embodiment and modifications described above may be combined to realize a modified video editing apparatus.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A video editing apparatus that edits a plurality of video material data pieces to generate a video program, the video editing apparatus comprising:
   a video material data storing unit operable to store the plurality of video material data pieces;
   a copyright royalty storing unit operable to store a copyright royalty for each of one or more copyright sections set with or without overlap in each of the plurality of video material data pieces, each copyright royalty of a respective copyright section being either (i) a fixed basis royalty which is a fixed fee charged for use of the copyright section or (ii) an as-used basis royalty charged for used of the copyright section per unit length;

a control unit operable to select one or more video material data pieces from among the plurality of video material data pieces stored in the video material data storing unit;

a usage section obtaining unit operable to obtain a usage section to be extracted from each of the selected video material data pieces, the usage sections being used to generate the video program;

a material royalty calculation unit operable to (i) read a copyright royalty for each copyright section set in each of the selected video material data pieces, (ii) calculate, for each read copyright royalty, if the read copyright royalty is an as-used basis royalty, a section royalty by multiplying the as-used basis royalty by a length of a portion of the corresponding copyright section overlapping the usage section, and (iii) calculate a material royalty by totaling the fixed basis royalties and the section royalties of all the copyright sections set in each of the selected video material data pieces;

a total royalty calculation unit operable to calculate a total royalty by totaling the material royalties of all the selected video material data pieces;

a display unit operable to display the total royalty; and a video program generating unit operable to generate the video program by extracting data corresponding to each usage section from each selected video material data piece and by concatenating all of the extracted data corresponding to the usage sections.

2. The video editing apparatus according to claim 1, wherein the control unit is further operable to cause the usage section obtaining unit to obtain, for a previously obtained usage section, a new usage section that is different from the previously obtained usage section, the material royalty calculation unit to re-calculate the section royalty and the material royalty based on the new usage section, the total royalty calculation unit to re-calculate the total royalty, the display unit to update the display of the total royalty, and the video program generating unit to extract data corresponding to the new usage section and generate a new video program using the data extracted from the new usage section.

3. The video editing apparatus according to claim 1, wherein the display unit is further operable to display, for each video material data piece, the usage section, all copyright sections in the video material data piece, and the fixed basis or as-used basis royalty of each copyright section.

4. The video editing apparatus according to claim 1, wherein the copyright royalty storing unit is further operable to store, for each copyright section, a payee of copyright royalties charged for use of the copyright section, the total royalty calculation unit is further operable to calculate a total royalty separately for each payee, by totaling all section royalties and as-used basis royalties charged for copyright sections corresponding to the payee, and the display unit is further operable to display the total royalties on a payee-by-payee basis.

5. A video editing method for use by a video editing apparatus that edits a plurality of video material data pieces to generate a video program, the video editing method comprising:

a control step of selecting one or more video material data pieces from among the video material data pieces stored in the video material data storing unit;

a usage section obtaining step of obtaining a usage section to be extracted from each of the selected video material data pieces, the usage sections being used to generate the video program;

a material royalty calculation step of (i) reading a copyright royalty for each copyright section set in each of the selected video material data pieces, (ii) calculating, for each read copyright royalty, if the read copyright royalty is an as-used basis royalty, a section royalty by multiplying the as-used basis royalty by a length of a portion of the corresponding copyright section overlapping the usage section, and (iii) calculating a material royalty by totaling the fixed basis royalties and the section royalties of all the copyright sections set in each of the selected video data material pieces;

a total royalty calculation step of calculating a total royalty by totaling the material royalties of all the selected video material data pieces;

a display step of displaying the total royalty; and a video program generating step of generating the video program by extracting data corresponding to each usage section from each selected video material data piece and by concatenating all of the extracted data corresponding to the usage sections.

6. A computer-readable recording medium storing a video editing program for use by a video editing apparatus that edits a plurality of video material data pieces to generate a video program, the video editing program comprising code operable to cause the video editing apparatus to perform:

a control step of selecting one or more video material data pieces from among the video material data pieces stored in the video material data storing unit;

a usage section obtaining step of obtaining a usage section to be extracted from each of the selected video material data pieces, the usage sections being used to generate the video program;

a material royalty calculation step of (i) reading a copyright royalty for each copyright section set in the selected video material data pieces, (ii) calculating, for each read copyright royalty, if the read copyright royalty is an as-used basis royalty, a section royalty by multiplying the as-used basis royalty by a length of a portion of the corresponding copyright section overlapping the usage section, and (iii) calculating a material royalty by totaling the fixed basis royalties and the section royalties of all the copyright sections set in the selected video data material pieces;

a total royalty calculation step of calculating a total royalty by totaling the material royalties of all the selected video material data pieces;

a display step of displaying the total royalty; and a video program generating step of generating the video program by extracting data corresponding to each usage section from each selected video material data piece and by concatenating all of the extracted data corresponding to the usage sections.

* * * * *

UNITED STATES PATENT AND TRADEMARK OFFICE
CERTIFICATE OF CORRECTION

PATENT NO. : 7,188,088 B2
APPLICATION NO. : 09/730767
DATED : March 6, 2007
INVENTOR(S) : Yoshiaki Iwata et al.

It is certified that error appears in the above-identified patent and that said Letters Patent is hereby corrected as shown below:

Title Page

Item [56], References Cited, U.S. Patent Documents, please add the following reference:

5,636,276 A *   6/1997   Brugger ......................... 705/54

Signed and Sealed this

Twenty-seventh Day of November, 2007

JON W. DUDAS
*Director of the United States Patent and Trademark Office*